United States Patent
Agarwal et al.

(10) Patent No.: US 9,893,988 B2
(45) Date of Patent: Feb. 13, 2018

(54) ADDRESS RESOLUTION USING MULTIPLE DESIGNATED INSTANCES OF A LOGICAL ROUTER

(71) Applicant: Nicira, Inc., Palo Alto, CA (US)

(72) Inventors: Vivek Agarwal, Campbell, CA (US); Ganesan Chandrashekhar, Campbell, CA (US); Rahul Korivi Subramaniyam, Sunnyvale, CA (US); Ram Dular Singh, Cupertino, CA (US); Howard Wang, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 470 days.

(21) Appl. No.: 14/227,964

(22) Filed: Mar. 27, 2014

(65) Prior Publication Data

US 2015/0281042 A1    Oct. 1, 2015

(51) Int. Cl.
*H04L 12/713* (2013.01)
*H04L 12/749* (2013.01)
*H04L 29/12* (2006.01)
*H04L 12/931* (2013.01)

(52) U.S. Cl.
CPC .......... *H04L 45/586* (2013.01); *H04L 45/741* (2013.01); *H04L 49/70* (2013.01); *H04L 61/2596* (2013.01)

(58) Field of Classification Search
CPC ... H04L 45/74; H04L 61/103; H04L 61/6013; H04L 63/0281; H04L 12/5689; G06F 2009/45595
See application file for complete search history.

(56) References Cited

U.S. PATENT DOCUMENTS

| 5,504,921 | A | 4/1996 | Dev et al. |
| 5,550,816 | A | 8/1996 | Hardwick et al. |
| 5,751,967 | A | 5/1998 | Raab et al. |
| 6,006,275 | A | 12/1999 | Picazo, Jr. et al. |
| 6,104,699 | A | 8/2000 | Holender et al. |
| 6,219,699 | B1 | 4/2001 | McCloghrie et al. |

(Continued)

FOREIGN PATENT DOCUMENTS

| EP | 1653688 | 5/2006 |
| JP | 2003-069609 | 3/2003 |

(Continued)

OTHER PUBLICATIONS

International Search Report and Written Opinion of PCT/US2014/072866, dated Apr. 21, 2015, Nicira, Inc.

(Continued)

*Primary Examiner* — Barbara B Anyan
(74) *Attorney, Agent, or Firm* — Adeli LLP

(57) ABSTRACT

A logical routing element (LRE) having multiple designated instances for routing packets from physical hosts (PH) to a logical network is provided. A PH in a network segment with multiple designated instances can choose among the multiple designated instances for sending network traffic to other network nodes in the logical network according to a load balancing algorithm. Each logical interface (LIF) of an LRE is defined to be addressable by multiple identifiers or addresses, and each LIF identifier or address is assigned to a different designated instance.

20 Claims, 28 Drawing Sheets

(56) References Cited

U.S. PATENT DOCUMENTS

| | | | |
|---|---|---|---|
| 6,359,909 | B1 | 3/2002 | Ito et al. |
| 6,456,624 | B1 | 9/2002 | Eccles et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,941,487 | B1 | 9/2005 | Balakrishnan et al. |
| 6,950,428 | B1 | 9/2005 | Horst et al. |
| 6,963,585 | B1 | 11/2005 | Le Pennec et al. |
| 6,999,454 | B1 | 2/2006 | Crump |
| 7,046,630 | B2 | 5/2006 | Abe et al. |
| 7,197,572 | B2 | 3/2007 | Matters et al. |
| 7,200,144 | B2 | 4/2007 | Terrell et al. |
| 7,209,439 | B2 | 4/2007 | Rawlins et al. |
| 7,260,648 | B2 | 8/2007 | Tingley et al. |
| 7,283,473 | B2 | 10/2007 | Arndt et al. |
| 7,339,929 | B2 | 3/2008 | Zelig et al. |
| 7,342,916 | B2 | 3/2008 | Das et al. |
| 7,391,771 | B2 | 6/2008 | Orava et al. |
| 7,450,598 | B2 | 11/2008 | Chen et al. |
| 7,463,579 | B2 | 12/2008 | Lapuh et al. |
| 7,478,173 | B1 | 1/2009 | Delco |
| 7,555,002 | B2 | 6/2009 | Arndt et al. |
| 7,606,260 | B2 | 10/2009 | Oguchi et al. |
| 7,643,488 | B2 | 1/2010 | Khanna et al. |
| 7,649,851 | B2 | 1/2010 | Takashige et al. |
| 7,710,874 | B2 | 5/2010 | Balakrishnan et al. |
| 7,764,599 | B2 | 7/2010 | Doi et al. |
| 7,792,987 | B1 | 9/2010 | Vohra et al. |
| 7,802,000 | B1 | 9/2010 | Huang et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,885,276 | B1 | 2/2011 | Lin |
| 7,936,770 | B1 | 5/2011 | Frattura et al. |
| 7,937,438 | B1 | 5/2011 | Miller et al. |
| 7,948,986 | B1 | 5/2011 | Ghosh et al. |
| 7,953,865 | B1 | 5/2011 | Miller et al. |
| 7,991,859 | B1 | 8/2011 | Miller et al. |
| 7,995,483 | B1 | 8/2011 | Bayar et al. |
| 8,027,354 | B1 | 9/2011 | Portolani et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,131,852 | B1 | 3/2012 | Miller et al. |
| 8,149,737 | B2 | 4/2012 | Metke et al. |
| 8,155,028 | B2 | 4/2012 | Abu-Hamdeh et al. |
| 8,166,201 | B2 | 4/2012 | Richardson et al. |
| 8,194,674 | B1 | 6/2012 | Pagel et al. |
| 8,199,750 | B1 | 6/2012 | Schultz et al. |
| 8,223,668 | B2 | 7/2012 | Allan et al. |
| 8,224,931 | B1 | 7/2012 | Brandwine et al. |
| 8,224,971 | B1 | 7/2012 | Miller et al. |
| 8,239,572 | B1 | 8/2012 | Brandwine et al. |
| 8,265,075 | B2 | 9/2012 | Pandey |
| 8,281,067 | B2 | 10/2012 | Stolowitz |
| 8,312,129 | B1 | 11/2012 | Miller et al. |
| 8,320,388 | B2 | 11/2012 | Louati et al. |
| 8,339,959 | B1 | 12/2012 | Moisand et al. |
| 8,339,994 | B2 | 12/2012 | Gnanasekaran et al. |
| 8,351,418 | B2 | 1/2013 | Zhao et al. |
| 8,370,834 | B2 | 2/2013 | Edwards et al. |
| 8,401,024 | B2 | 3/2013 | Christensen et al. |
| 8,456,984 | B2 | 6/2013 | Ranganathan et al. |
| 8,504,718 | B2 | 8/2013 | Wang et al. |
| 8,565,108 | B1 | 10/2013 | Marshall et al. |
| 8,611,351 | B2 | 12/2013 | Gooch et al. |
| 8,611,352 | B2 | 12/2013 | Mizrahi et al. |
| 8,612,627 | B1 | 12/2013 | Brandwine |
| 8,625,594 | B2 | 1/2014 | Safrai et al. |
| 8,625,603 | B1 | 1/2014 | Ramakrishnan et al. |
| 8,625,616 | B2 | 1/2014 | Vobbilisetty et al. |
| 8,627,313 | B2 | 1/2014 | Edwards et al. |
| 8,644,188 | B1 | 2/2014 | Brandwine et al. |
| 8,660,129 | B1 | 2/2014 | Brendel et al. |
| 8,848,508 | B2 | 9/2014 | Moreno et al. |
| 8,958,298 | B2 | 2/2015 | Zhang et al. |
| 9,059,999 | B2 | 6/2015 | Koponen et al. |
| 9,137,052 | B2 | 9/2015 | Koponen et al. |
| 2001/0043614 | A1 | 11/2001 | Viswanadham et al. |
| 2002/0093952 | A1 | 7/2002 | Gonda |
| 2002/0194369 | A1 | 12/2002 | Rawlins et al. |
| 2003/0041170 | A1 | 2/2003 | Suzuki |
| 2003/0058850 | A1 | 3/2003 | Rangarajan et al. |
| 2003/0069972 | A1 | 4/2003 | Yoshimura et al. |
| 2004/0073659 | A1 | 4/2004 | Rajsic et al. |
| 2004/0098505 | A1 | 5/2004 | Clemmensen |
| 2004/0267866 | A1 | 12/2004 | Carollo et al. |
| 2005/0018669 | A1 | 1/2005 | Arndt et al. |
| 2005/0027881 | A1 | 2/2005 | Figueira et al. |
| 2005/0053079 | A1 | 3/2005 | Havala |
| 2005/0083953 | A1 | 4/2005 | May |
| 2005/0120160 | A1 | 6/2005 | Plouffe et al. |
| 2005/0132044 | A1 | 6/2005 | Guingo et al. |
| 2006/0002370 | A1 | 1/2006 | Rabie et al. |
| 2006/0026225 | A1 | 2/2006 | Canali et al. |
| 2006/0029056 | A1 | 2/2006 | Perera et al. |
| 2006/0056412 | A1 | 3/2006 | Page |
| 2006/0092976 | A1 | 5/2006 | Lakshman et al. |
| 2006/0174087 | A1 | 8/2006 | Hashimoto et al. |
| 2006/0187908 | A1 | 8/2006 | Shimozono et al. |
| 2006/0193266 | A1 | 8/2006 | Siddha et al. |
| 2006/0291388 | A1 | 12/2006 | Amdahl et al. |
| 2007/0043860 | A1 | 2/2007 | Pabari |
| 2007/0064673 | A1 | 3/2007 | Bhandaru et al. |
| 2007/0140128 | A1 | 6/2007 | Klinker et al. |
| 2007/0156919 | A1 | 7/2007 | Potti et al. |
| 2007/0201357 | A1 | 8/2007 | Smethurst et al. |
| 2007/0297428 | A1 | 12/2007 | Bose et al. |
| 2008/0002579 | A1 | 1/2008 | Lindholm et al. |
| 2008/0002683 | A1 | 1/2008 | Droux et al. |
| 2008/0013474 | A1 | 1/2008 | Nagarajan et al. |
| 2008/0049621 | A1 | 2/2008 | McGuire et al. |
| 2008/0049646 | A1 | 2/2008 | Lu |
| 2008/0059556 | A1 | 3/2008 | Greenspan et al. |
| 2008/0069107 | A1 | 3/2008 | Sofia et al. |
| 2008/0071900 | A1 | 3/2008 | Hecker et al. |
| 2008/0086726 | A1 | 4/2008 | Griffith et al. |
| 2008/0151893 | A1 | 6/2008 | Nordmark et al. |
| 2008/0159301 | A1 | 7/2008 | de Heer |
| 2008/0189769 | A1 | 8/2008 | Casado et al. |
| 2008/0225853 | A1 | 9/2008 | Melman et al. |
| 2008/0240122 | A1 | 10/2008 | Richardson et al. |
| 2008/0253366 | A1 | 10/2008 | Zuk et al. |
| 2008/0291910 | A1 | 11/2008 | Tadimeti, Sr. et al. |
| 2008/0298274 | A1 | 12/2008 | Takashige et al. |
| 2009/0031041 | A1 | 1/2009 | Clemmensen |
| 2009/0043823 | A1 | 2/2009 | Iftode et al. |
| 2009/0083445 | A1 | 3/2009 | Ganga |
| 2009/0092137 | A1 | 4/2009 | Haigh et al. |
| 2009/0122710 | A1 | 5/2009 | Bar-Tor et al. |
| 2009/0150521 | A1 | 6/2009 | Tripathi |
| 2009/0150527 | A1 | 6/2009 | Tripathi et al. |
| 2009/0161547 | A1 | 6/2009 | Riddle et al. |
| 2009/0249470 | A1 | 10/2009 | Litvin et al. |
| 2009/0249473 | A1 | 10/2009 | Cohn |
| 2009/0279536 | A1 | 11/2009 | Unbehagen et al. |
| 2009/0292858 | A1 | 11/2009 | Lambeth et al. |
| 2009/0300210 | A1 | 12/2009 | Ferris |
| 2009/0303880 | A1 | 12/2009 | Maltz et al. |
| 2010/0046531 | A1 | 2/2010 | Louati et al. |
| 2010/0107162 | A1* | 4/2010 | Edwards .............. G06F 9/5077 718/1 |
| 2010/0131636 | A1 | 5/2010 | Suri et al. |
| 2010/0153554 | A1 | 6/2010 | Anschutz et al. |
| 2010/0153701 | A1 | 6/2010 | Shenoy et al. |
| 2010/0165877 | A1 | 7/2010 | Shukla et al. |
| 2010/0169467 | A1 | 7/2010 | Shukla et al. |
| 2010/0192225 | A1 | 7/2010 | Ma et al. |
| 2010/0205479 | A1 | 8/2010 | Akutsu et al. |
| 2010/0208615 | A1 | 8/2010 | Soon et al. |
| 2010/0214949 | A1 | 8/2010 | Smith et al. |

(56) References Cited

U.S. PATENT DOCUMENTS

| | | |
|---|---|---|
| 2010/0275199 A1 | 10/2010 | Smith et al. |
| 2010/0290485 A1 | 11/2010 | Martini et al. |
| 2011/0016215 A1 | 1/2011 | Wang |
| 2011/0022695 A1 | 1/2011 | Dalal et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram Sathish Kumar et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0225207 A1 | 9/2011 | Subramanian et al. |
| 2011/0261825 A1 | 10/2011 | Ichino |
| 2011/0264610 A1 | 10/2011 | Armstrong et al. |
| 2011/0283017 A1 | 11/2011 | Alkhatib et al. |
| 2011/0299534 A1 | 12/2011 | Koganti et al. |
| 2011/0299537 A1* | 12/2011 | Saraiya ............... H04L 61/2596 370/392 |
| 2011/0310899 A1 | 12/2011 | Alkhatib et al. |
| 2012/0014386 A1 | 1/2012 | Xiong et al. |
| 2012/0131643 A1 | 5/2012 | Cheriton |
| 2012/0158997 A1 | 6/2012 | Hsu et al. |
| 2012/0182992 A1 | 7/2012 | Cowart et al. |
| 2012/0236734 A1 | 9/2012 | Sampath et al. |
| 2013/0007740 A1 | 1/2013 | Kikuchi et al. |
| 2013/0034094 A1 | 2/2013 | Cardona et al. |
| 2013/0044636 A1 | 2/2013 | Koponen et al. |
| 2013/0058346 A1 | 3/2013 | Sridharan et al. |
| 2013/0103817 A1 | 4/2013 | Koponen et al. |
| 2013/0125112 A1 | 5/2013 | Mittal et al. |
| 2013/0142048 A1 | 6/2013 | Gross et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0266015 A1 | 10/2013 | Qu et al. |
| 2013/0266019 A1 | 10/2013 | Qu et al. |
| 2013/0268588 A1* | 10/2013 | Chang ................ H04L 12/6418 709/204 |
| 2013/0301553 A1 | 11/2013 | Klien |
| 2013/0339544 A1 | 12/2013 | Mithyantha |
| 2014/0025779 A1 | 1/2014 | Matsumoto |
| 2014/0036730 A1* | 2/2014 | Nellikar ................. H04L 49/70 370/255 |
| 2014/0064276 A1 | 3/2014 | Basso et al. |
| 2014/0169215 A1 | 6/2014 | Rajendran et al. |
| 2014/0169222 A1 | 6/2014 | Cohen et al. |
| 2014/0195666 A1 | 7/2014 | Dumitriu et al. |
| 2014/0233567 A1 | 8/2014 | Guo et al. |
| 2015/0058968 A1* | 2/2015 | Wang ...................... H04L 51/12 726/12 |
| 2015/0103661 A1* | 4/2015 | Shen ..................... H04L 41/042 370/235 |
| 2015/0103839 A1 | 4/2015 | Chandrashekhar et al. |
| 2015/0103842 A1 | 4/2015 | Chandrashekhar et al. |
| 2015/0103843 A1 | 4/2015 | Chandrashekhar et al. |
| 2015/0106804 A1* | 4/2015 | Chandrashekhar ... H04L 45/741 718/1 |
| 2015/0117454 A1* | 4/2015 | Koponen ............ H04L 61/2532 370/392 |
| 2015/0124817 A1 | 5/2015 | Merchant et al. |
| 2015/0281048 A1 | 10/2015 | Agarwal et al. |
| 2016/0021032 A1 | 1/2016 | Maier et al. |

FOREIGN PATENT DOCUMENTS

| | | |
|---|---|---|
| JP | 2003-124976 | 4/2003 |
| JP | 2003-318949 | 11/2003 |
| KR | 1020070050864 A | 5/2007 |
| WO | 2005094008 A1 | 10/2005 |
| WO | WO 2005/112390 | 11/2005 |
| WO | WO 2008/095010 | 8/2008 |
| WO | WO 2015/054671 | 4/2015 |
| WO | WO 2015/147942 | 10/2015 |

OTHER PUBLICATIONS

Aggarwal, R., et al., "Data Center Mobility based on E-VPN, BGP/MPLS IP VPN, IP Routing and NHRP; draft-raggarwa-data-center-mobility-05.txt," Jun. 10, 2013, pp. 1-24, Internet Engineering Task Force, IETF, Standardworkingdraft, Internet Society (ISOC) 4, Rue Des Falaises CH-1205 Geneva, Switzerland.

Al-Fares, Mohammad, et al., "A Scalable, Commodity Data Center Network Architecture," Aug. 17-22, 2008, pp. 63-74, Seattle, Washington, USA.

Andersen, David, et al., "Resilient Overlay Networks," Oct. 2001, 15 pages, 18th ACM Symp. On Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building A Fast, Virtualized Data Plane with Programmable Hardware," Aug. 17, 2009, pp. 1-8, VISA'09, Barcelona, Spain, ACM.

Author Unknown, "HP OpenView Enterprise Management Starter Solution," Jun. 2006, p. 1-4, Hewlett-Packard Development Company, HP.

Author Unknown, "Cisco VN-Link: Virtualization-Aware Networking," Month Unknown, 2009, 10 pages, Cisco Systems, Inc.

Author Unknown, "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP OpenView Operations 8.0 for UNIX Developer's Toolkit," Month Unknown, 2004, pp. 1-4, Hewlett-Packard Development Company, HP.

Author Unknown, "HP Web Jetadmin Integration into HP OpenView Network Node Manager," Feb. 2004, pp. 1-12, HP.

Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown, "Intel 82599 10 Gigabit Ethernet Controller: Datasheet, Revision: 2.73," Dec. 2011, 930 pages, Intel Corporation.

Author Unknown, "Introduction to VMware Infrastructure: ESX Server 3.5, ESX Server 3i version 3.5, VirtualCenter 2.5," Dec. 2007, pp. 1-46, Revision: Dec. 13, 2007, VMware, Inc., Palo Alto, California, USA.

Author Unknown, "Open vSwitch, An Open Virtual Switch," Dec. 30, 2010, 2 pages, Cisco Systems, Inc.

Author Unknown, "OpenFlow Switch Specification, Version 0.9.0 (Wire Protocol 0x98)," Jul. 20, 2009, pp. 1-36, Open Networking Foundation.

Author Unknown, OpenFlow Switch Specification, Version 1.0.0 (Wire Protocol 0x01), Dec. 31, 2009, pp. 1-42, Open Networking Foundation.

Author Unknown, "Private Network-Network Interface Specification Version 1.1 (PNNI 1.1)," The ATM Forum Technical Committee, Apr. 2002, 536 pages, The ATM Forum.

Author Unknown, "Single Root I/O Virtualization and Sharing Specification, Revision 1.0," Sep. 11, 2007, pp. 1-84, PCI-SIG.

Author Unknown, "Virtual Machine Device Queues," White Paper, Month Unknown, 2007, pp. 1-4, Intel Corporation.

Author Unknown, "VMware for Linux Networking Support," month unknown, 1999, 5 pages, VMware, Inc.

(56) References Cited

OTHER PUBLICATIONS

Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI'05: 2nd Symposium on Networked Systems Design & Implementation , Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," month unknown, 2008, pp. 1-6.
Casado, Martin, et al., "SANE: A Protection Architecture for Enterprise Networks," Proceedings of the 15th USENIX Security Symposium, Jul. 31, 2006, pp. 137-151.
Casado, Martin, et al., "Scaling Out: Network Virtualization Revisited," month unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Das, Suarav, et al. "Simple Unified Control for Packet and Circuit Networks," Month Unknown, 2009, pp. 147-148, IEEE.
Das, Suarav, et al., "Unifying Packet and Circuit Switched Networks with OpenFlow," Dec. 7, 2009, 10 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Davoli, Renzo, "VDE: Virtual Distributed Ethernet," Feb. 2005, pp. 1-8, TRIDENTCOM'05, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Dumitriu, Dan Mihai, et al. (U.S. Appl. No. 61/514,990), filed Aug. 4, 2011.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCE)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Foster, Nate, et al., "Frenetic: A Network Programming Language," ICFP '11, Sep. 19-21, 2011, 13 pages, Tokyo, Japan.
Godfrey, P. Brighten, et al., "Pathlet Routing," Aug. 2009, pp. 1-6, SIGCOMM.
Greenberg, Albert, et al., "A Clean Slate 4D Approach to Network Control and Management," Oct. 2005, 12 pages, vol. 35, No. 5, ACM SIGCOMM Computer Communication Review.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," Apr. 2009, pp. 21-26, vol. 39, No. 2, ACM SIGCOMM Computer Communication Review.
Gude, Natasha, et al., "NOX: Towards an Operating System for Networks," Jul. 2008, pp. 105-110, vol. 38, No. 3, ACM SIGCOMM Computer Communication Review.
Guo, Chanxiong, et al., "BCube: A High Performance, Server-centric Network Architecture for Modular Data Centers," SIGCOMM'09, Aug. 17-21, 2009, 12 pages, ACM, Barcelona, Spain.
Hamilton, James, et al., "Datacenter Networks Are in My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
John, John P., et al., "Consensus Routing: The Internet as a Distributed System," Apr. 2008, 14 pages, Proc. of NSDI.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," month unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, pp. 1-34, vol. 18, No. 3.
Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Loo, Boon Thau, et al., "Declarative Routing: Extensible Routing with Declarative Queries," In Proc. of SIGCOMM, Aug. 21-26, 2005, 12 pages, Philadelphia, PA, USA.
Loo, Boon Thau, et al., "Implementing Declarative Overlays," In Proc. of SOSP, Oct. 2005, 16 pages, Brighton, UK.
Luo, Jianying, et al., "Prototyping Fast, Simple, Secure Switches for Ethane," Month Unknown, 2007, pp. 1-6.
Maltz, David A., et al., "Routing Design in Operational Networks: A Look from the Inside," SIGCOMM'04, Aug. 30-Sep. 3, 2004, 14 pages, ACM, Portland, Oregon, USA.
Mann, Vijay, etal., "Crossroads: Seamless VM Mobility Across Data Centers Through Software Defined Networking," IEEE Network Operations and Management Symposium (NOMS), Apr. 16-20, 2012, pp. 88-96, IEEE, Piscataway, NJ, US.
McKeown, Nick, et al., "OpenFlow: Enabling Innovation in Campus Networks," Mar. 14, 2008, 6 pages, vol. 38, No. 2, ACM SIGCOMM.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. of SIGCOMM, Aug. 17-21, 2009, pp. 1-12, Barcelona, Spain.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben, et al., "Extending Networking into the Virtualization Layer," Proc. of HotNets, Oct. 2009, pp. 1-6.
Popa, Lucian, et al., "Building Extensible Networks with Rule-Based Forwarding," In USENIX OSDI, Month Unknown, 2010, pp. 1-14.

(56) References Cited

OTHER PUBLICATIONS

Rosen, E., et al., "Applicability Statement for BGP/MPLS IP Virtual Private Networks (VPNs)," The Internet Society, RFC 4365, Feb. 2006, pp. 1-32.

Shenker, Scott, et al., "The Future of Networking, and the Past of Protocols," Dec. 2, 2011, pp. 1-30, USA.

Sherwood, Rob, et al., "Can the Production Network Be the Testbed?," Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Spalink, Tammo, et al., "Building a Robust Software-Based Router Using Network Processors," Month Unknown, 2001, pp. 216-229, ACM, Banff, CA.

Tavakoli, Arsalan, et al., "Applying NOX to the Datacenter," month unknown, 2009, 6 pages, Proceedings of HotNets.

Touch, J., et al., "Transparent Interconnection of Lots of Links (TRILL): Problem and Applicability Statement," May 2009, pp. 1-17, IETF Trust, RFC 5556.

Turner, Jon, et al., "Supercharging PlanetLab—A High Performance, Multi-Application Overlay Network Platform," SIGCOMM-07, Aug. 27-31, 2007, 12 pages, ACM, Kyoto, Japan.

Turner, Jonathan S., "A Proposed Architecture for the GENI Backbone Platform," ANCS'06, Dec. 3-5, 2006, 10 pages, ACM, San Jose, California, USA.

Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.

Wang, Yi, et al., "Virtual Routers on the Move: Live Router Migration as a Network-Management Primitive," SIGCOMM 08, Aug. 17-22, 2008, 12 pages, ACM, Seattle, Washington, USA.

Yang, L., et al., "Forwarding and Control Element Separation (ForCES) Framework," Apr. 2004, pp. 1-41, The Internet Society RFC(3746).

Yu, Minlan, et al., "Scalable Flow-Based Networking with DIFANE," Aug. 2010, pp. 1-16, In Proceedings of SIGCOMM.

\* cited by examiner

| LRE X | LIF IP addresses | LIF IP addresses | DI MAC address |
|---|---|---|---|
| | LIF VLAN100 | 2.1.1.251 | 11:11:11:11:11:01 (PMAC1) |
| | | 2.1.1.252 | 11:11:11:11:11:02 (PMAC2) |
| | 1011 | 2.1.1.253 | 11:11:11:11:11:03 (PMAC3) |
| | LIF VLAN200 | 2.1.2.251 | 11:11:11:11:12:01 (PMAC4) |
| | | 2.1.2.252 | 11:11:11:11:12:02 (PMAC5) |
| | 1012 | 2.1.2.253 | 11:11:11:11:12:03 (PMAC6) |
| | LIF VXLAN500 | 2.1.3.251 | 11:11:11:11:11:01 (PMAC1) |
| | | 2.1.3.252 | 11:11:11:11:13:02 (PMAC8) |
| | 1013 | 2.1.3.253 | 11:11:11:11:13:03 (PMAC9) |
| | LIF VXLAN600 | 2.1.4.251 | 11:11:11:11:14:01 (PMAC10) |
| | | 2.1.4.252 | 11:11:11:11:14:02 (PMAC11) |
| | 1014 | 2.1.4.253 | 11:11:11:11:12:03 (PMAC6) |

ADDRESS RESOLUTION USING MULTIPLE DESIGNATED INSTANCES OF A LOGICAL ROUTER

BACKGROUND

In a network virtualization environment, one of the more common applications deployed on hypervisors are 3-tier apps, in which a web-tier, a database-tier, and app-tier are on different L3 subnets. This requires IP (internet protocol) packets traversing from one virtual machine (VM) in one subnet to another VM in another subnet to first arrive at a L3 router, then forwarded to the destination VM using L2 MAC (media access control) address. This is true even if the destination VM is hosted on the same host machine as the originating VM. This generates unnecessary network traffic and causes higher latency and lower throughput, which significantly degrades the performance of the application running on the hypervisors. Generally speaking, this performance degradation occurs whenever any two VMs in two different network segments (e.g., different IP subnet, different L2 segments, or different overlay logical networks) communicate with each other.

FIG. 1 illustrates a logical network implemented over a network virtualization infrastructure 100, in which virtual machines (VMs) 121-129 belonging to different network segments communicate with each other through a shared L3 router 110. The VMs 121-129 are running on host machines 131-133, which are physical machines communicatively linked with each other and to the shared L3 router 110 by a physical network 105. A VM in network segment A can only communicates with a VM in network segment B through the physical network 105 and the shared L3 router 110, whether the VMs are in different host machines (e.g., from the VM 122 to the VM 127) or in the same host machine (e.g., from the VM 125 to the VM 126).

U.S. patent application Ser. No. 14/137,862, filed on Dec. 20, 2013, describes a logical router element (LRE) that operates distributively across different host machines as a virtual distributed router (VDR). Each host machine operates its own local instance of the LRE as a managed physical routing element (MPRE) for performing L3 packet forwarding for the VMs running on that host. The LRE therefore makes it possible to forward data packets locally (i.e., at the originating hypervisor) without going through a shared L3 router.

Furthermore, an LRE as described by U.S. patent application Ser. No. 14/137,862 not only performs L3 routing for VMs operating in host machines that operate the LRE, but also performs L3 routing for physical routers/hosts or other network nodes that do not operate the LRE. One particular host machine operating the LRE is selected as the designated host machine, and its MPRE is the designated instance of the LRE for handling L3 routing of traffic from the physical routers.

SUMMARY

In some embodiments, a logical routing element (LRE) includes one or more logical interfaces (LIFs) that each serve as an interface to a corresponding segment of a logical network. Each network segment has its own logical interface to the LRE, and each LRE has its own set of logical interfaces. In some embodiments, at least one of the LIFs of a LRE is defined to be addressable by two or more identifiers (e.g., IP addresses). Some embodiments allow each LIF identifier to serve as a destination address for network traffic.

In some embodiments, a network segments can encompass multiple IP subnets, and a LIF interfacing such a network segment is addressable by IP addresses that are in different IP subnets. In some embodiments, a network segment that is an overlay encapsulation network (e.g., VXLAN or VLAN) includes multiple IP subnets.

A physical host (PH) is a network node that belongs to a logical network but does not operate a local instance of the logical network's LRE. In some embodiments, network traffic from a PH to a VM is routed by a designated host machine that does operate a local instance of the LRE (i.e., MPRE). The local instance of the LRE running on such a designated host is referred as a "designated instance" or "DI" in some embodiments. In some embodiments, a logical network (or an LRE) has multiple designated instances for some or all of the network segments. A PH in a network segment with multiple designated instances can choose among the multiple designated instances for sending network traffic to other network nodes in the logical network for load balancing purposes. In order to support multiple designated instances per network segment, a corresponding LIF in some embodiments is defined to be addressable by multiple identifiers or addresses (e.g., IP addresses), where each LIF identifier or address is assigned to a different designated instance. In some embodiments, each LIF identifier serves as a destination address for network traffic. Each designated instance (DI) assigned to a particular LIF identifier in turn handles network traffic for that particular assigned LIF identifier.

Some embodiments advertise the IP addresses of the LIF of that particular network segment as a list of available next hops. Once a list of designated instances is made available to a physical host, the physical host is able to select any one of the designated instances as a next hop into the logical network. Such selection can be based on any number of criteria and can be made for any number of purposes. In some embodiments, a physical host selects a designated instance as the next hop based on current network traffic information in order to balance the traffic load between the different designated host machines. In some embodiments, a PH uses the list of designated instances to perform ECMP (Equal Cost Multi-path Routing) algorithms on ingress network traffic to the logical network.

In some embodiments, packets coming from physical hosts (PHs) rely on routing table entries in designated instances for routing. In some embodiments, these entries are filled by address resolution protocols (ARP) initiated by PHs or by DIs themselves. In some embodiments, a PH that has received a list of IP addresses as next hops performs ARP operation to translate the received L3 IP address into L2 MAC addresses in order to ascertain the PMAC addresses of the designated instances. In some embodiments, the designated instances not only resolve IP addresses for packets that come from external PHs, but also for packets coming from VMs running on host machines having a local instance of the LRE. The routing utilizes routing table entries in the available designated instances of a particular LIF.

In some embodiments, each MPRE select a designated instance for requesting address resolution based on the destination IP address. Such address resolution requests and address resolution replies are UDP messages in some embodiments. In some embodiments, an MPRE would make such an address resolution request to a designated instance that is associated with a LIF address that is in a same IP subnet as the destination IP address. In some embodiments, each designated instance is for resolving IP addresses that are in the same subnet as its assigned LIF IP address. In some embodiments, when a designated instance is not able to resolve a destination IP address upon receiving an address resolution request, it will perform an ARP operation in order to resolve the unknown IP address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 illustrates conceptually illustrates a LRE in which each LIF has multiple IP addresses, and each IP address has its own corresponding designated instance.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In some embodiments, a logical routing element (LRE) includes one or more logical interfaces (LIFs) that each serve as an interface to a corresponding segment of the network. Each network segment has its own logical interface to the LRE, and each LRE has its own set of logical interfaces. In some embodiments, at least one of the LIFs of a LRE is defined to be addressable by two or more identifiers (e.g., IP addresses). Some embodiments allow each LIF identifier to serve as a destination address for network traffic. In some embodiments, a network segments can encompass multiple IP subnets, and a LIF interfacing such a network segment is addressable by IP addresses that are in different IP subnets. In some embodiments, a network segment that is an overlay encapsulation network (e.g., VXLAN or VLAN) includes multiple IP subnets.

Figure 1:
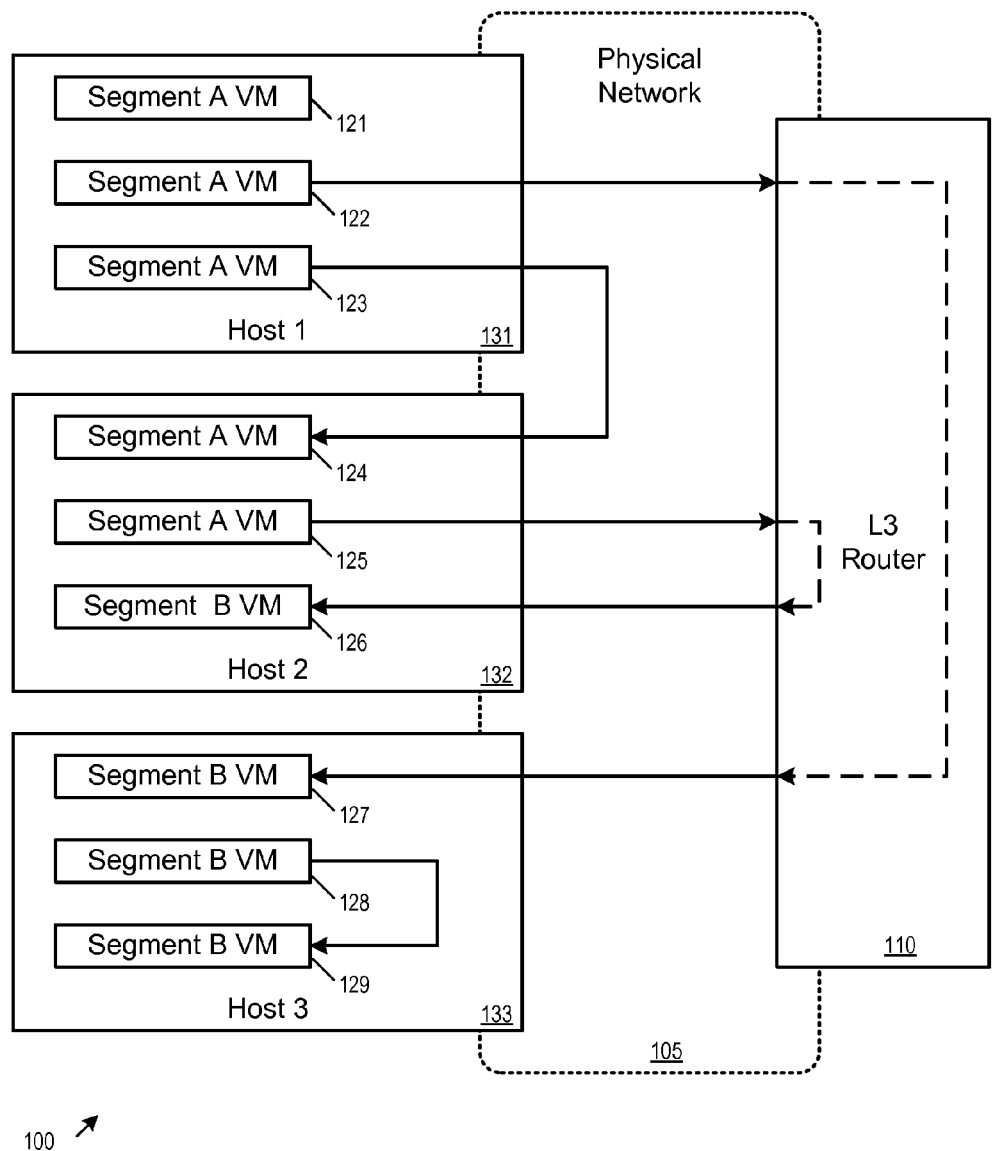
FIG. 1 illustrates a logical network implemented over a network virtualization infrastructure, in which virtual machines (VMs) on different segments or subnets communicate through a shared router.
Figure 2:
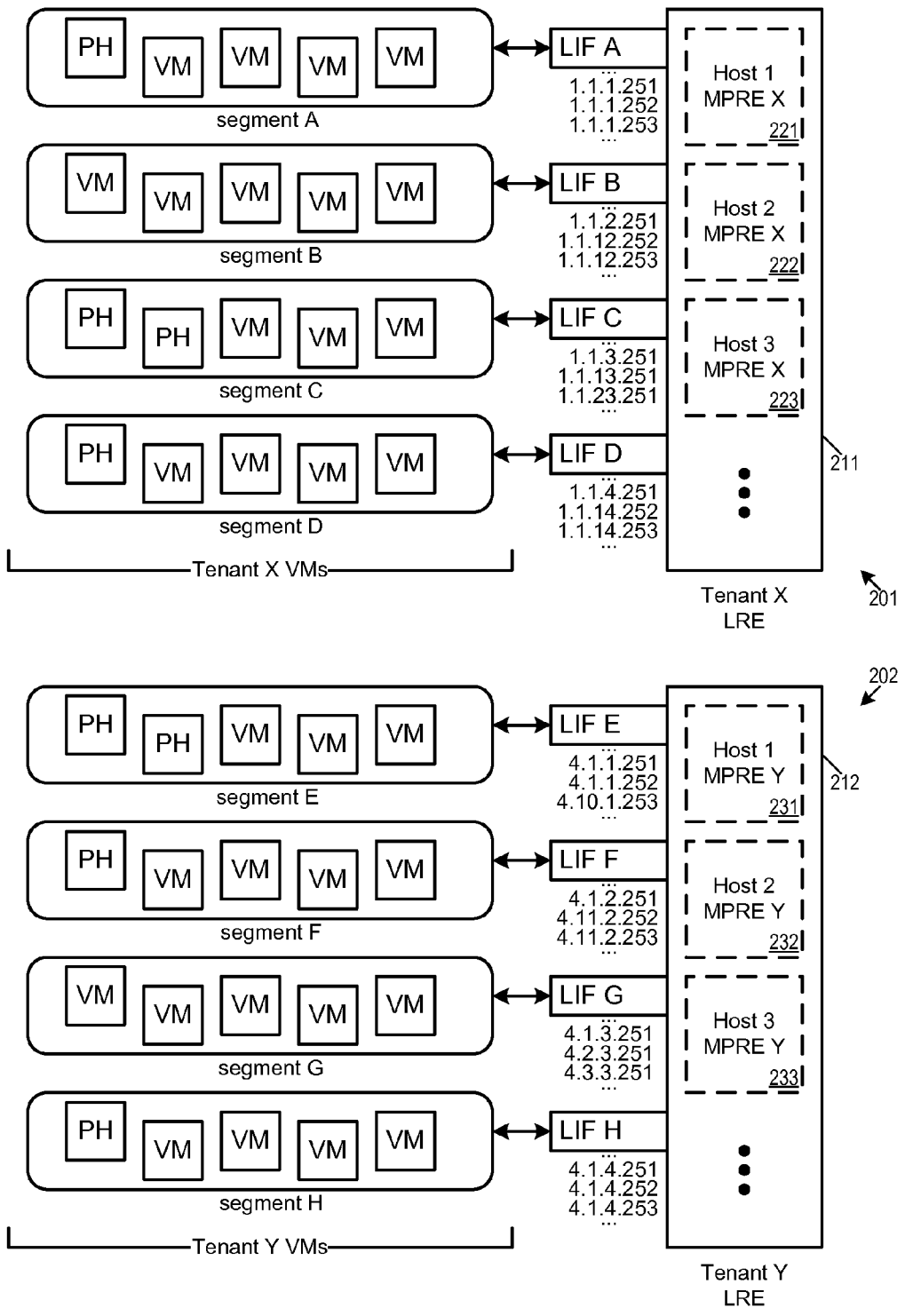
FIG. 2 conceptually illustrates a virtualized network environment that uses LREs to implement L3 packet forwarding between network nodes.

For some embodiments, FIG. 2 conceptually illustrates a virtualized network environment 200 that uses LREs to implement L3 packet forwarding between network nodes. As illustrated, the virtualized network environment 200 is a multi-tenancy network environment that serves two different tenants X and Y, and is implementing two different logical networks 201 and 202 for these two different tenants. The logical network 201 includes segments A, B, C, and D for tenant X, while the logical network 202 includes network segments E, F, G, and H for tenant Y. Each segment includes one or more network nodes that are each labeled either as "VM" (virtual machine) or "PH" (physical host). The logical network 201 has a LRE 211 for handling L3 routing between network segments A, B, C, and D, while the logical network 202 has a LRE 212 for handling L3 routing between network segments E, F, G, and H.

In some embodiments, the virtualized network environment 200 is implementing the logical networks 201 and 202 over a virtualization infrastructure that includes several host machines interconnected by a physical network, as described in more detail below. Some of these host machines are operating virtualization software or hypervisors that allow them to host one or more VMs. Some of these host machines are also operating local instances of the LREs as managed physical routing elements (MPREs) that allow the host machines to distributively perform L3 routing between network nodes in different network segments. Each MPRE (i.e., a local instance of an LRE) running on a host machine functions as the local physical router for the VMs operating on that host machine. Logical routing elements (LRE) or virtual distributed routers (VDR) are described in U.S. patent application Ser. No. 14/137,862, published as U.S. Patent Application Publication No. 2015/0106804 which is hereby incorporated by reference.

Each network segment includes one or more individually addressable network nodes that consumes, generates, or forwards network traffic. In some embodiments, a network segment is a portion of the network (e.g., an IP subnet). In some embodiments, a network segment is defined by a L2 logical switch and includes network nodes interconnected by that logical switch. In some embodiments, a network segment is an encapsulation overlay network such as VXLAN or VLAN. Such a network segment can span multiple data centers and/or include multiple IP subnets in some embodiments. In some embodiments, a logical network can include different types of network segments (e.g., a mixture of VLANs and VXLANs). In some embodiments, network nodes in a same segment are able to communicate with each other by using link layer (L2) protocols (e.g., according to each network node's L2 MAC address), while network nodes in different segments of the network cannot communicate with each other with a link layer protocol and must communicate with each other through network layer (L3) routers or gateways.

As illustrated in FIG. 2, some of these network nodes are virtual machines ("VM") running on host machines, while others are stand-alone network nodes such as physical routers or physical host machines ("PH"). For some embodiments, a VM is a network node that is hosted by a host machine. Each of the host machines also operates a local instance of a LRE as its MPRE such that packets from the VMs can be routed locally at that host machine to other segments of its logical network. Conversely, a PH is a network node that is not hosted by such a host machine. A PH does not have a local instance of a LRE to locally route its packet to other segments of its logical network. In some embodiments, a PH belonging to a network segment uses a MPRE of another host machine (i.e., an LRE instance local to another host machine) for routing within the logical network. Routing for PH network nodes will be further described in Section II below.

The LREs 211 and 212 are the logical routers for the logical networks 201 and 202, respectively. The LRE 211 handles routing only for the traffic of tenant X while the LRE 212 handles routing only for the traffic of tenant Y. Consequently, the network traffic of tenant X is entirely isolated in the logical plane from the network traffic of tenant Y, although they may share physical resources, as further described below.

As mentioned, an LRE operates distributively across the host machines in its logical network as a virtual distributed router (VDR), where each host machine operates its own local instance of the LRE as a MPRE for performing L3 packet forwarding for the VMs running on that host. In FIG. 2, the LRE 211 (LRE for tenant X) is illustrated as encompassing MPREs 221-223, while the LRE 212 (LRE for tenant Y) is illustrated as encompassing MPREs 231-233. In other words, each of the MPREs 221-223 is a local instance of the LRE 211 running on a different host machine for tenant X, while each of MPRE 231-233 is a local instance of the LRE 212 running on a different host machine for tenant Y.

As illustrated, each of LREs 211 and 212 includes a set of logical interfaces (LIFs) that each serves as an interface to a particular segment of the network. The LRE 211 has LIF A, LIF B, LIF C, and LIF D for handling packets to and from the network segments A, B, C, and D, respectively, while the LRE 212 has LIF E, LIF F, LIF G, and LIF G for handling packets to and from the network segments E, F, G, and H, respectively. Each logical interface is assigned its own set of identifiers (e.g., IP address or overlay network identifier) that is unique within the network virtualization environment 200. For example, LIF A of LRE 211 assigned IP addresses 1.1.1.251, 1.1.1.252, and 1.1.1.253, and LIF F is assigned IP addresses 4.1.2.251, 4.11.2.252, and 4.11.2.253. Each of these LIF identifiers can serve as a destination address for network traffic, in other words, the multiple IP addresses (or identifiers) of a LIF allows the LIF to appear as multiple different network traffic destinations. For example, in some embodiments, each LIF IP address serves as an address of a default gateway or ARP proxy for network nodes of its particular network segment. Having multiple IP addresses per LIF provides the network nodes in the corresponding network segments a list of gateways or proxies to choose from.

Figure 3:
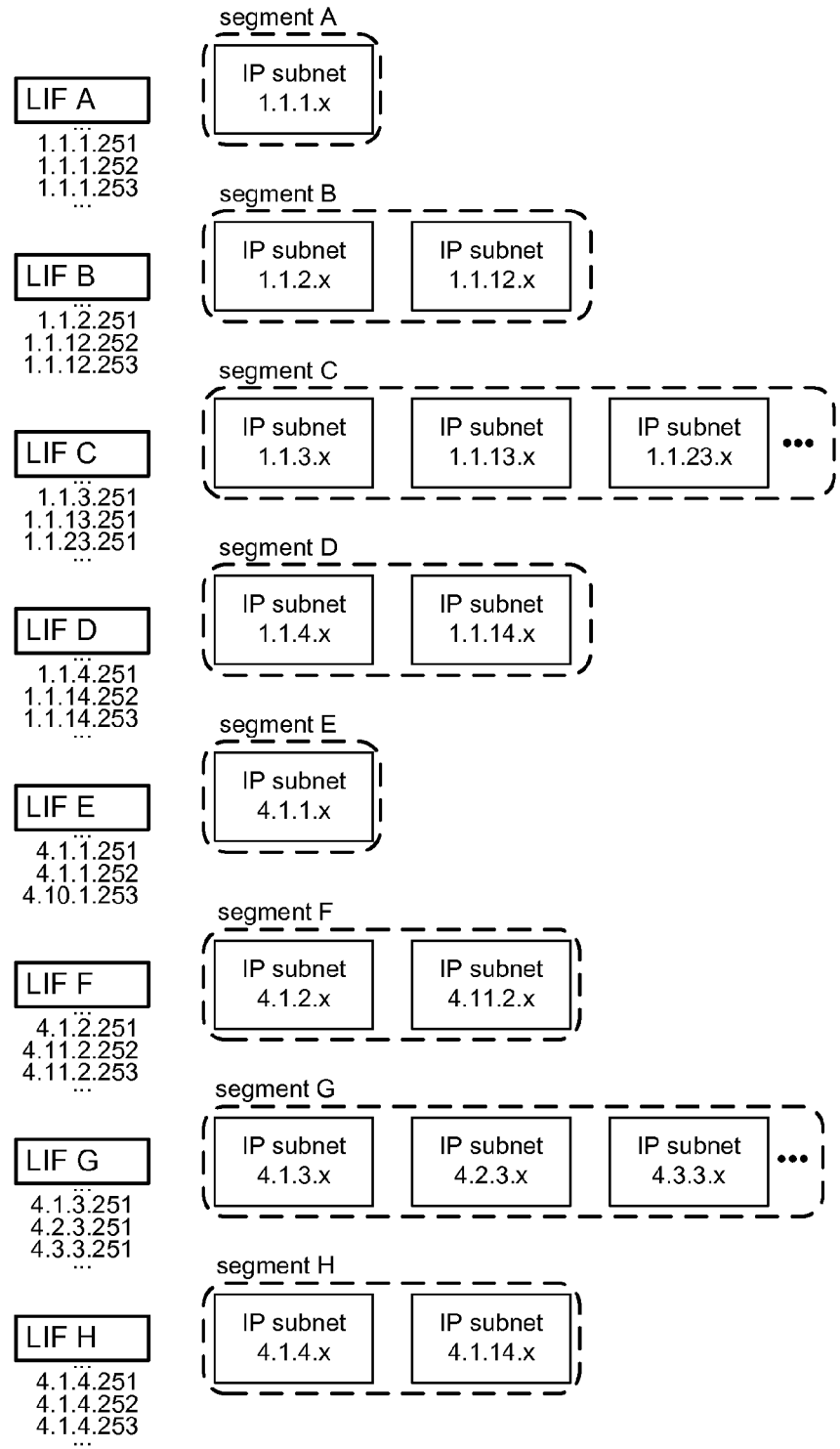
FIG. 3 illustrates LIFs that interface network segments that include one or more IP subnets.

In some embodiments, a network segments can encompass multiple IP subnets, and a LIF interfacing such a network segment is addressable by IP addresses that are in different IP subnets. In some embodiments, a network segment that is an overlay encapsulation network (e.g., VXLAN or VLAN) includes multiple IP subnets. FIG. 3 illustrates LIFs that interface network segments that include one or more IP subnets. Specifically, FIG. 3 illustrates LIFs A-H of the LREs 211 and 212 and their corresponding network segments A-H.

As illustrated, some of the network segments (e.g., network segments A and E) include only one IP subnet. A LIF interfacing such a network segment have all of its LIF addresses in one IP subnet. For example, the network segment A only includes network nodes in IP subnet 1.1.1.x, and the LIF addresses for its corresponding LIF (LIF A) are also all in the IP subnet 1.1.1.x (i.e., 1.1.1.251, 1.1.1.252, 1.1.1.253). On the other hand, some of the network segments include multiple IP subnets. For example, the network segment B includes IP subnets 1.1.2.x and 1.1.12.x, while the segment C includes IP subnets 1.1.3.x, 1.1.13.x, and 1.1.23.x. In some embodiments, a LIF of a network segment also has LIF IP addresses in those multiple subnets of the network segments. For example, LIF B has IP addresses in IP subnet 1.1.2.x (1.1.2.251) as well as in IP subnet 1.1.12.x (1.1.12.252 and 1.1.12.253). In some of these embodiments, network nodes in a particular IP subnet uses only LIF addresses in the same IP subnet when accessing the LIF. For example, in some embodiments, VMs in subnet 1.1.14.x of segment D uses only the addresses 1.1.14.252 or 1.1.14.253 to address LIF D but not 1.1.4.251, even though 1.1.4.251 is also an address of the same LIF.

In some embodiments, the IP addresses of a LIF need not correspond exactly with the IP subnets in the LIF's network segment. For example, a LIF may have an IP address that is not in any of the network segment's subnets (e.g., the network segment E does not have IP subnet that encompasses the LIF address 4.10.1.253 in LIF E), or a LIF may have a subnet that does not have at least one LIF address that is in that subnet (e.g., LIF H does not have a LIF address in the subnet 4.1.14.x).

Figure 4:
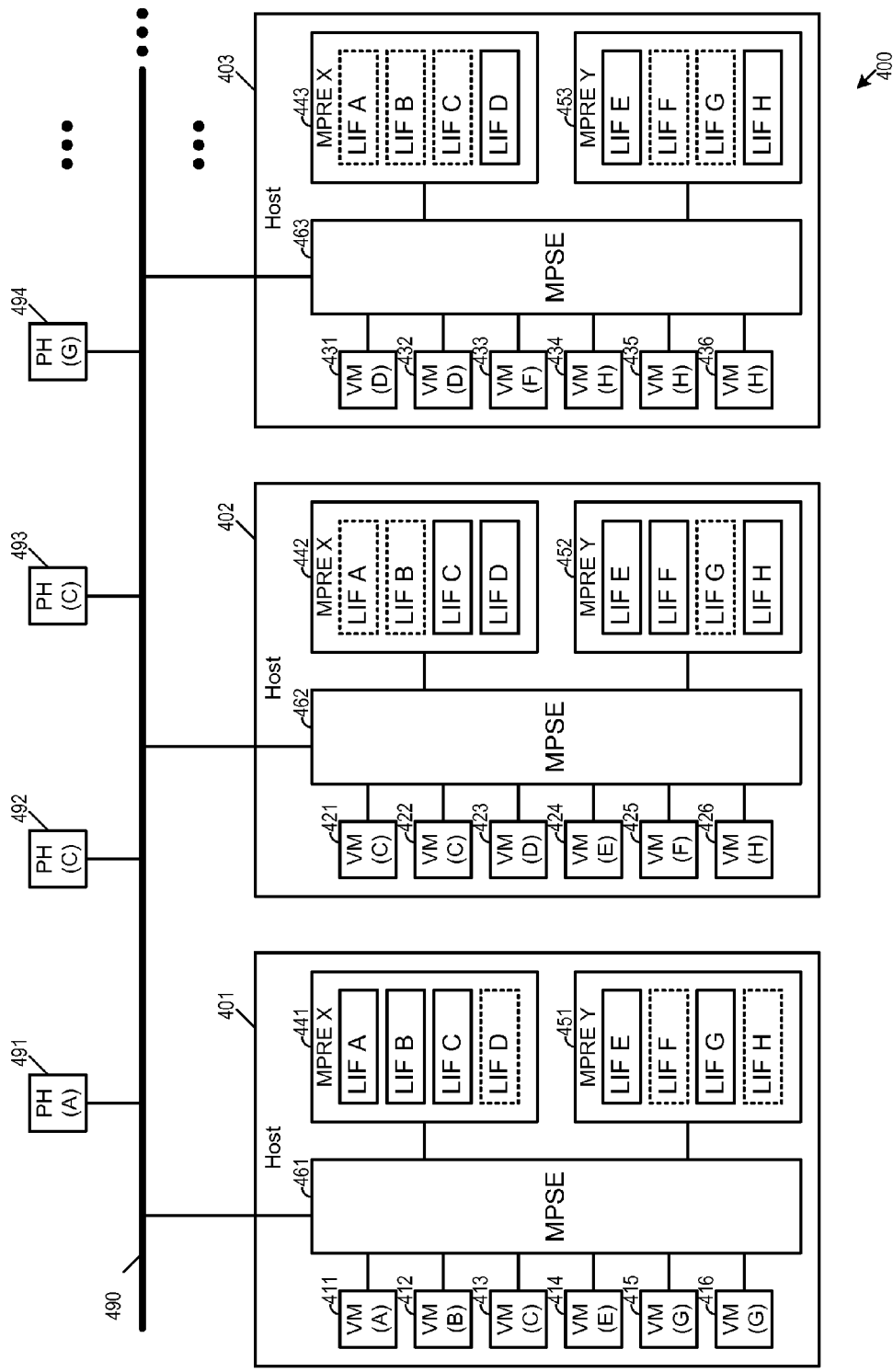
FIG. 4 illustrates the physical implementation of LREs in host machines of a network virtualization infrastructure.

Several figures below (e.g., FIGS. 6-9) use the IP address and network segment assignment of FIGS. 2-4. One of ordinary skill would understand that the values of IP addresses and labels of network segments of FIGS. 2-9 are arbitrarily chosen for purposes of illustration, and that the various embodiments described in those figures as well as other figures are entirely independent of the specific names or numerical values chosen.

Several more detailed embodiments of the invention are described below. Section I describes distributed routing using LREs in virtualized network environment. Section II describes various applications of a LIF that has multiple LIF identifiers. Section III describes the control and configuration of LRE. Finally, section IV describes an electronic system with which some embodiments of the invention are implemented.

I. Logical Routing Element

As mentioned, some embodiments use logical routing elements (LREs) for routing packets between network nodes in different network segments. These LREs operate in a distributed manner across multiple host machines, each of these host machines operating a local instance of the LRE as its managed physical routing element (MPRE). In some embodiments, each of these host machines is also operating a virtualization software or a hypervisor that allows it to host one or more virtual machines (VMs) and to provide network access to those VMs. In some embodiments, the host machines running the LREs are in a network virtualization infrastructure over a physical network. Such a network virtualization infrastructure in some embodiments includes physical network nodes (such as external edge routers) that belong to a network segment that is served by one of the LREs and yet does not operate the LRE itself.

FIG. 4 illustrates the physical implementation of the LREs 211 and 212 in host machines of a network virtualization infrastructure 400. Specifically, the figure illustrates the (partial) implementation of the logical networks 201 and 202 in host machines 401-403. The host machines 401-403 are communicatively interconnected through a physical network 490. Physical hosts (PH) 491-494 are also connected to the physical network 490 and communicatively interconnected with host machines 401-403.

As illustrated, the host machine 401 is hosting VMs 411-416, the host machine 402 is hosting VMs 421-426, and the host machine 403 is hosting VMs 431-436. These VMs belong to different network segments. Namely, the VM 411 belongs to segment A, the VM 412 belongs to segment B, the VM 413, 421, 422 belong to segment C, the VMs 431, 432 belong to segment D, the VMs 414, 424 belong to segment E, the VMs 425 and 433 belong to segment F, the VMs 415, 416 belong to segment G, and the VMs 426, 434-436 belong to segment H.

Each host machine is operating two MPREs for the two different LREs 211 and 212. Specifically, the host machine 401 is operating MPREs 441 and 451, the host machine 402 is operating MPREs 442 and 452, and the host machine 403 is operating MPREs 443 and 453. The MPREs 441-443 are local instances of the LRE 211 operating in the host machines 401-403, respectively, for the logical network 201 of tenant X. The MPREs 451-453 are local instances of the LRE 212 operating in the host machines 401-403, respectively, for the logical network 202 of tenant Y.

A MPRE residing on a host machine has a set of LIFs (i.e., the LIFs of the LRE) for interfacing with the VMs operating on that host machine. For example, the MPRE 441 has LIFs A, B, C, and D as the local instance of the LRE 211. The LIF A of the MPRE 441 serves the VM 411 (a segment A VM), the LIF B of MPRE 441 serves the VM 412 (a segment B VM), and the LIF C of MPRE 441 serves the VM 413 (a segment C VM). As illustrated, an MPRE of a LRE/logical network may reside on a host machine that does not have VMs in all network segments, and the MPRE therefore may have LIFs that are inactive. For example, the host machine 401 does not have a VM belonging to segment D, and the LIF D of its MPRE 441 is therefore not activated (illustrated with dashed borders).

Each MPRE of a host machine handles the L3 routing of packets coming from the VMs that are served by the MPRE's LIFs. In other words, each MPRE handles the L3 routing of the VMs belonging to network segments that form the logical network of its parent LRE. For example, the MPRE 441 performs L3 routing for VMs 411-413 (belonging to network segments A, B, C of the logical network 201), while the MRPE 442 performs L3 routing for VMs 414-416 (belonging to network segments E and G of the logical network 202).

Each host machine is also operating a managed physical switching element (MPSE) for performing L2 level switching between the VMs and the MPREs on that host machine. The MPSE of each host machine also has an uplink connection to the physical network 490 so the VMs and the MPREs in the host machine can exchange packets with network nodes outside of the host machine (e.g., VMs in other host machines and PHs) over the physical network 490. For example, packets can arrive at the MPSE 461 of the host 401 from the physical network 490 through the uplink, from one of the MPREs (441 or 442), or from one of the VMs (411-416). Packets that require L3 level routing are forwarded by the MPSE 461 to one of the MPREs 441 or 451, and the routed packet are sent back to the MPSE 461 to be forwarded to their L2 destination within the host machine 401 or outside of the host machine reachable by the physical network 490.

In some embodiments, all MPREs are addressable within its host machine (i.e., by the MPSE of the host machine) by a same virtual MAC address (VMAC), while each MPRE is addressable from network nodes outside of its host machine by a physical MAC address (PMAC) that uniquely identifies the MPRE. Such a PMAC in some embodiments distinguishes a MPRE operating in one host machine from another MPRE operating in another host machine, even when those MPREs are instances of a same LRE. In some embodiments, though MPREs of different tenants on a same host machine are addressable by a same MAC (either VMAC or PMAC) at the MPSE of the host machine, the MPREs are able to keeps packets of different logical networks (and of different clients) separate by using network segment identifiers (e.g., VNI, VXLAN ID or VLAN tag or ID). For example, the LIFs A, B, C, and D of MPRE 441 ensures that the MPRE 441 receives only packets with identifiers for network segments A, B, C, or D, while the LIFs E, F, G, and H of MPRE 442 ensures that the MPRE 442 receives only packets with identifiers for network segments E, F, G, and H. The operations of MPSE are described in U.S. patent application Ser. No. 14/137,862.

Physical hosts (PH) 491-494 are network nodes that, though belonging to logical networks 201 or 202, do not operate a local instance of either the LRE 211 or the LRE 212. Specifically, the PH 491 belongs to network segment A, the PHs 492 and 493 belong to network segment C, and the PH 493 belong to network segment G. In some embodiments, a PH is a physical host machine that does not run virtualization software at all and does not host any VMs. In some embodiments, some physical host machines are legacy network elements (such as filer or another non-hypervisor/non-VM network stack) built into the underlying physical network, which used to rely on standalone routers for L3 layer routing. In some embodiments, a PH is an edge router or a routing gateway that serves as an interface for the logical networks 201 or 202 with other external networks. In some embodiments, such an edge router is a VM running on a host machine that operates hypervisor/virtualization software, but the host machine of the edge router does not operate an LRE for either logical network 201 or 202. In order to perform L3 layer routing for these PH network nodes, some embodiments designate one or more MPREs running in the host machines of the network virtualization infrastructure 400 to act as a dedicated routing agent (designated instance or designated MPRE) for these PHs. In some embodiments, L2 traffic to and from these PHs are handled by local instances of MPSEs in the host machines without having to go through a designated MPRE. Designated instances will be further described in Section II.a below.

Figure 5:
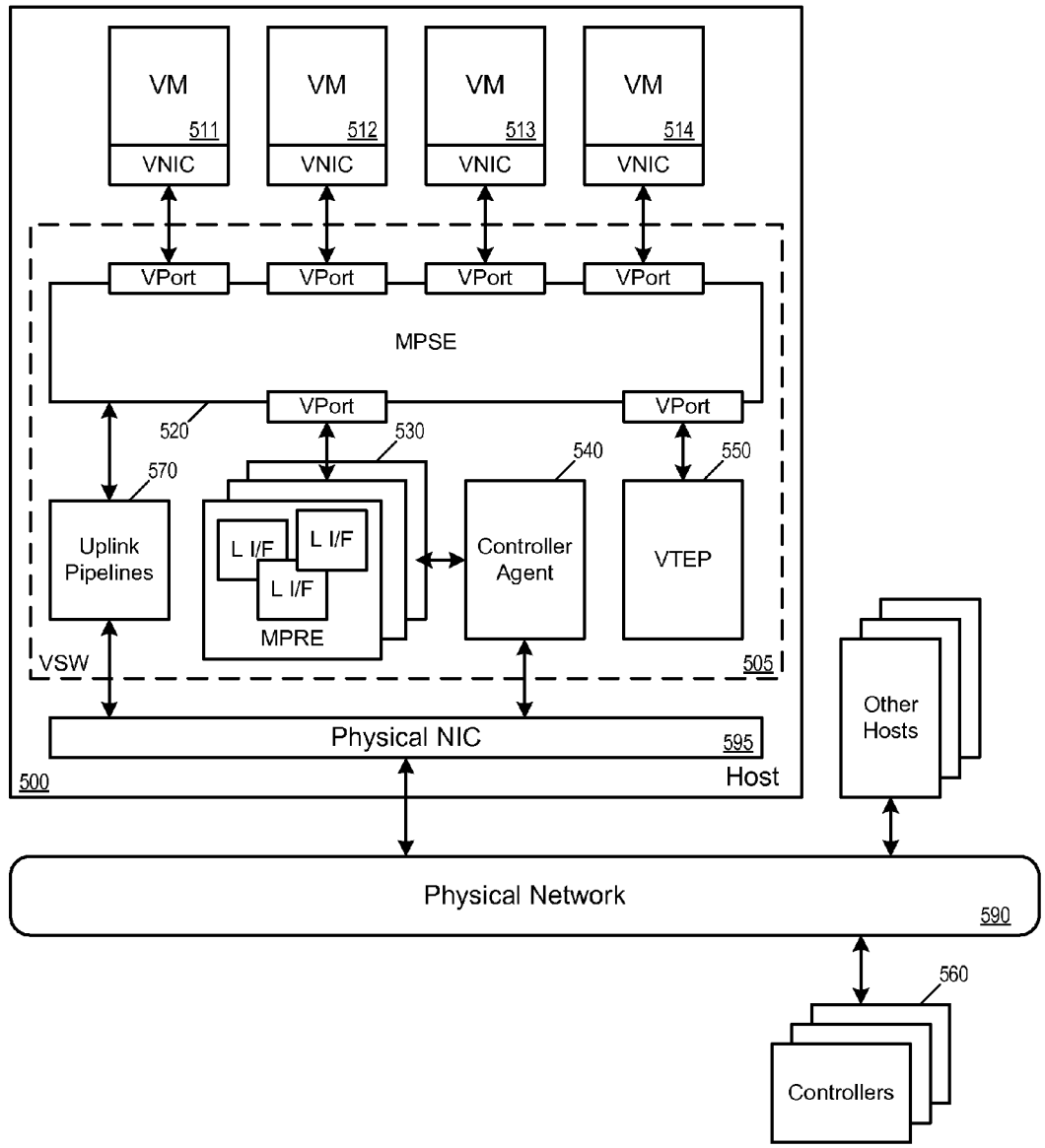
FIG. 5 illustrates a host machine running a virtualization software that includes a MPRE of an LRE.

In some embodiments, a LRE operates within a virtualization software (e.g., a hypervisor, virtual machine monitor, etc.) that runs on a host machine that hosts one or more VMs (e.g., within a multi-tenant data center). The virtualization software manages the operations of the VMs as well as their access to the physical resources and the network resources of the host machine, and the local instantiation of the LRE operates in the host machine as its local MPRE. For some embodiments, FIG. 5 illustrates a host machine 500 running a virtualization software 505 that includes a MPRE of an LRE. The host machine connects to, e.g., other similar host machines, through a physical network 590. This physical network 590 may include various physical switches and routers, in some embodiments.

As illustrated, the host machine 500 has access to a physical network 590 through a physical NIC (PNIC) 595. The host machine 500 also runs the virtualization software 505 and hosts VMs 511-514. The virtualization software 505 serves as the interface between the hosted VMs and the physical NIC 595 (as well as other physical resources, such as processors and memory). Each of the VMs includes a virtual NIC (VNIC) for accessing the network through the virtualization software 505. Each VNIC in a VM is responsible for exchanging packets between the VM and the virtualization software 505. In some embodiments, the VNICs are software abstractions of physical NICs implemented by virtual NIC emulators.

The virtualization software 505 manages the operations of the VMs 511-514, and includes several components for managing the access of the VMs to the physical network (by implementing the logical networks to which the VMs connect, in some embodiments). As illustrated, the virtualization software includes several components, including a MPSE 520, a MPRE 530, a controller agent 540, a VTEP 550, and a set of uplink pipelines 570.

The controller agent 540 receives control plane messages from a controller or a cluster of controllers. In some embodiments, these control plane message includes configuration data for configuring the various components of the virtualization software (such as the MPSE 520 and the MPRE 530) and/or the virtual machines. In the example illustrated in FIG. 5, the controller agent 540 receives control plane messages from the controller cluster 560 from the physical network 590 and in turn provides the received configuration data to the MPRE 530 through a control channel without going through the MPSE 520. However, in some embodiments, the controller agent 540 receives control plane messages from a direct data conduit (not illustrated) independent of the physical network 590. In some other embodiments, the controller agent receives control plane messages from the MPSE 520 and forwards configuration data to the router 530 through the MPSE 520. The controller agent and the configuration of the virtualization software will be further described in Section III below.

The VTEP (VXLAN tunnel endpoint) 550 allows the host 500 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 500 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 570.

The MPSE 520 delivers network data to and from the physical NIC 595, which interfaces the physical network 590. The MPSE also includes a number of virtual ports (vPorts) that communicatively interconnects the physical NIC with the VMs 511-514, the MPRE 530 and the controller agent 540. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 590 (e.g., another VM running on another host). In some embodiments, a MPSE is a local instantiation of a logical switching element (LSE) that operates across the different host machines and can perform L2 packet switching between VMs on a same host machine or on different host machines.

The MPRE 530 performs L3 routing (e.g., by performing L3 IP address to L2 MAC address resolution) on data packets received from a virtual port on the MPSE 520. Each routed data packet is then sent back to the MPSE 520 to be forwarded to its destination according to the resolved L2 MAC address. This destination can be another VM connected to a virtual port on the MPSE 520, or a reachable L2 network element on the physical network 590 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs).

In some embodiments, the MPRE 530 includes one or more logical interfaces (LIFs) that each serves as an interface to a particular segment of the network. In some embodiments, each LIF is addressable by its own IP address and serve as a default gateway or ARP proxy for network nodes (e.g., VMs) of its particular segment of the network. As described in detail below, in some embodiments, all of the MPREs in the different host machines are addressable by a same "virtual" MAC address, while each MPRE is also assigned a "physical" MAC address in order indicate in which host machine does the MPRE operate.

The uplink module 570 relays data between the MPSE 520 and the physical NIC 595. The uplink module 570 includes an egress chain and an ingress chain that each performs a number of operations. Some of these operations are pre-processing and/or post-processing operations for the MPRE 530. The operations of the uplink module are described in U.S. patent application Ser. No. 14/137,862.

As illustrated by FIG. 5, the virtualization software 505 has multiple MPREs from multiple different LREs. In a multi-tenancy environment, a host machine can operate virtual machines from multiple different users or tenants (i.e., connected to different logical networks). In some embodiments, each user or tenant has a corresponding MPRE instantiation in the host for handling its L3 routing. In some embodiments, though the different MPREs belong to different tenants, they all share a same vPort on the MPSE 520, and hence a same L2 MAC address (VMAC or PMAC). In some other embodiments, each different MPRE belonging to a different tenant has its own port to the MPSE.

The MPSE 520 and the MPRE 530 make it possible for data packets to be forwarded amongst VMs 511-514 without being sent through the external physical network 590 (so long as the VMs connect to the same logical network, as different tenants' VMs will be isolated from each other).

Figure 6:
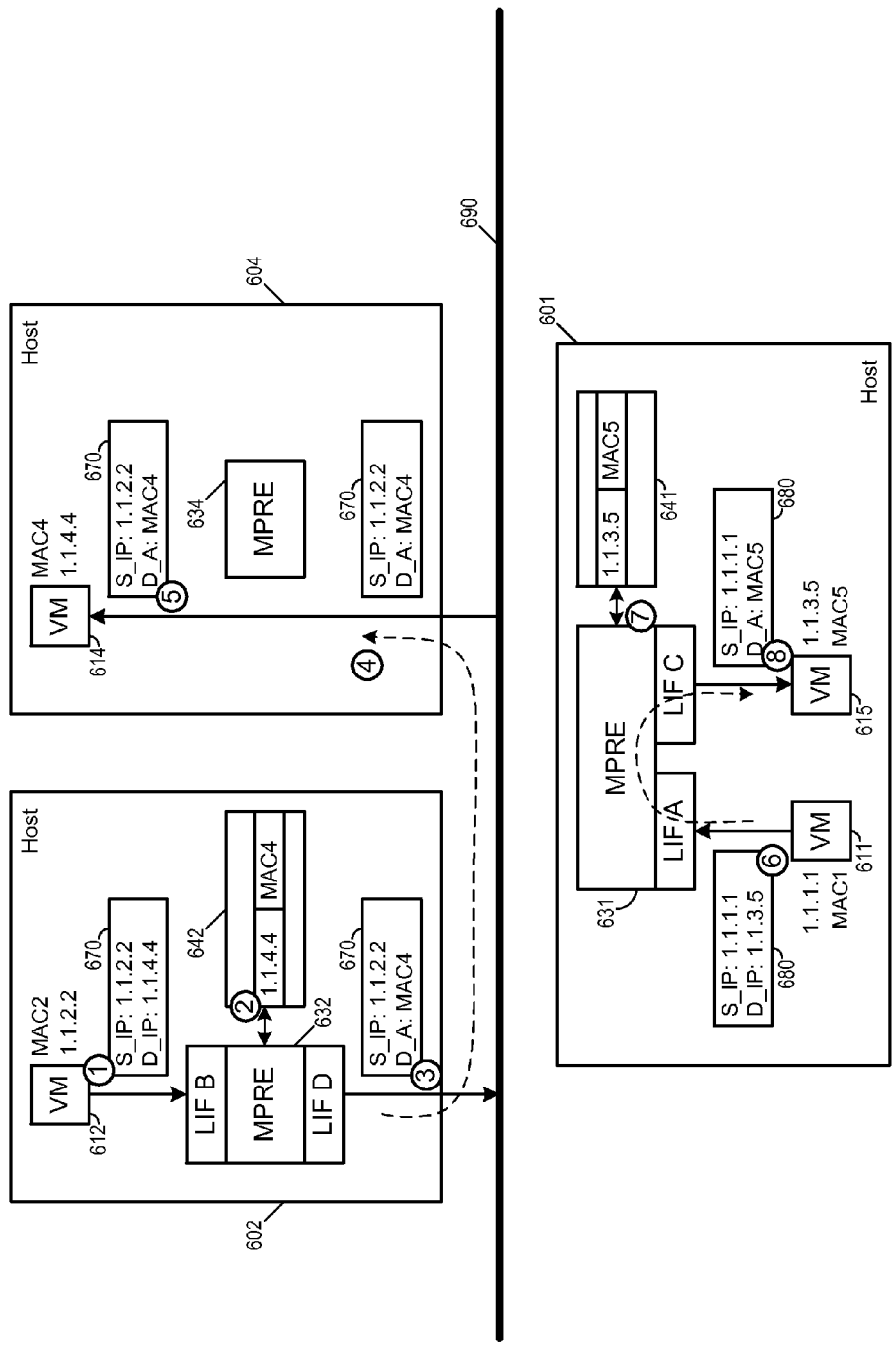
FIG. 6 illustrates the use of MPREs for performing distributed L3 routing for VMs in different host machines.

A MPRE running on a host machine allows L3 routing of packets between VMs running on a same host machine to be done locally at the host machine without having to go through the physical network. FIG. 6 illustrates the use of MPREs for performing distributed L3 routing for VMs in different host machines. Specifically, FIG. 6 illustrates MPREs performing L3 routing between VMs in a same host machine and between VMs in different host machines.

Figure 7:
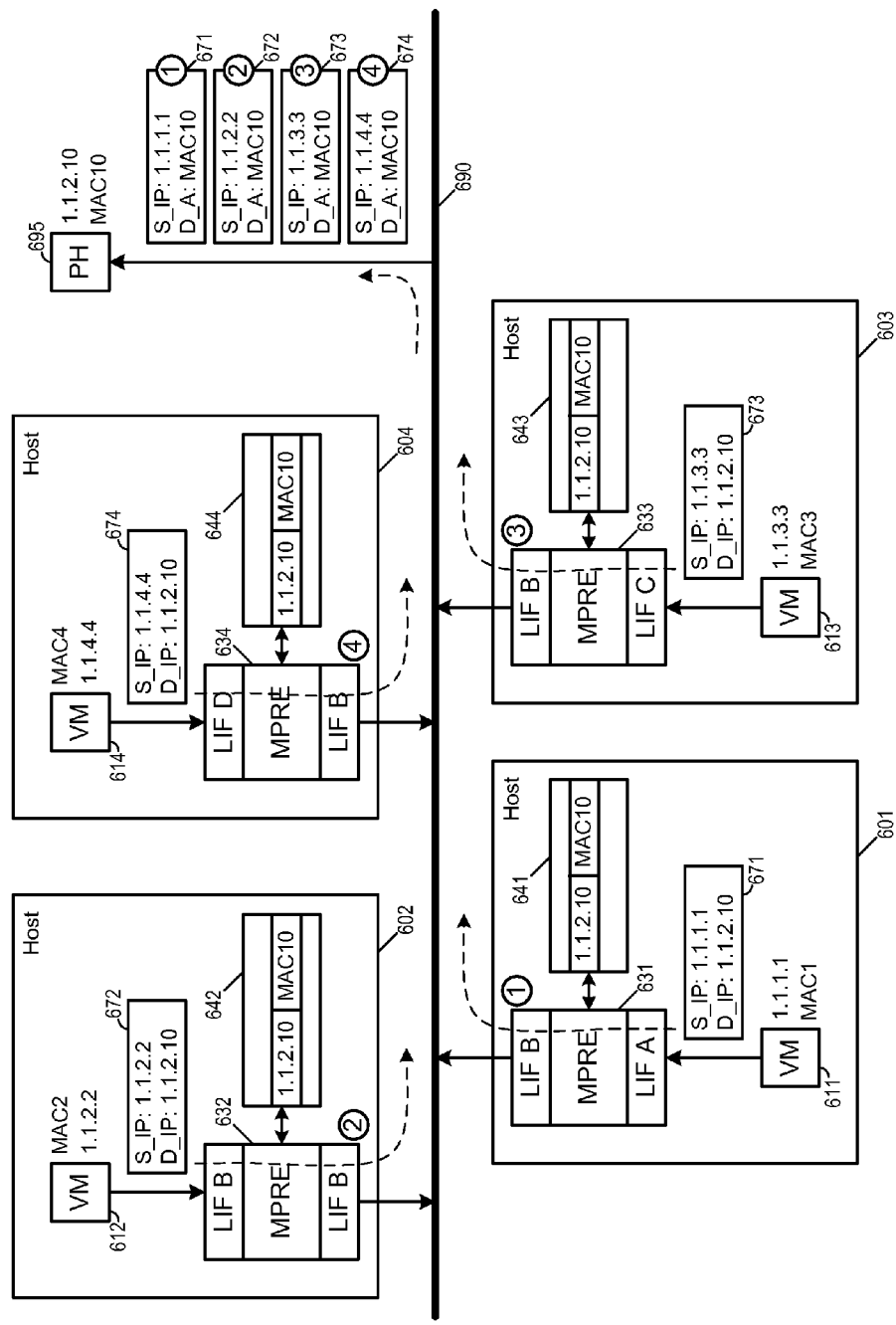
FIG. 7 illustrates the distributed L3 routing of data packets from the VMs to a PH.

As illustrated, a physical network 690 supports network communications between host machines 601-604 (the host machine 604 is illustrated in FIG. 7). The host machines 601-604 are operating MPREs 631-634, respectively. The MPREs 631-634 are local instances of a same LRE. Each MPRE has a corresponding routing table (641-644 for MPREs 631-634, respectively) for mapping L3 IP addresses into L2 MAC addresses. The LRE (and hence the MPREs) have LIFs for network segments A, B, C, and D. The host machine 602 is hosting a VM 612, which is a network node in network segment B. The host machine 604 is hosting a VM 614, which is a network node in network segment D. The host machine 601 is hosting VMs 611 and 615, which are network nodes in network segments A and C, respectively.

FIG. 6 illustrates the routing of a packet 670 from the VM 612 to the VM 614 in operations labeled '1' through '5'. The VMs 612 and 614 are VMs operating in different host machines. The packet 670 indicates that it is from IP address 1.1.2.2, and that it is destined for IP address 1.1.4.4. At operation '1', the VM 612 sends the packet 670 to the MPRE 632 through its LIF B because the VM 612 is a network node in network segment B (as indicated by its IP address 1.1.2.2). At operation '2', the MPRE 632 uses its routing table 642 to map the destination IP address 1.1.4.4 to "MAC4", which is the L2 address of the VM 614 in host machine 604.

At operation '3', the MPRE realizes that destination address 1.1.4.4 is in a subnet in network segment D and therefore uses its LIF D to send out the packet 670 with "MAC4" as the destination MAC address. Though not illustrated, the packet 670 is forwarded out by an MPSE in the host machine 602. The MPSE recognizes that "MAC4" is not in the host machine 602 and sends it out to the physical network 690.

At operation '4', the packet 670 reaches the host machine 604. Since the packet 670 is already routed (i.e., having a routed MAC address), the MPSE of the host machine 604 in operation '5' forward the packet 670 to L2 address "MAC4" (i.e., the VM 614) without going through the MPRE 634.

FIG. 6 also illustrates the routing of a packet 680 from the VM 611 to the VM 615 in operations labeled '6' through '8'. The packet 680 indicates that it is from IP address 1.1.1.1, and that it is destined for IP address 1.1.3.5. The VMs 611 and 615 are VMs operating in a same host machine 601. At operation '6', the VM 611 sends the packet 680 to the MPRE 631 through its LIF A because the VM 611 is a network node in network segment A (as indicated by its IP address 1.1.1.1). At operation '7', the MPRE 631 uses its routing table 641 to map the destination IP address 1.1.3.5 to "MAC5", which is the L2 address of the VM 615.

At operation '8', the MPRE realizes that destination address 1.1.3.3 is in a subnet belonging to network segment C and therefore uses its LIF C to send out the packet 680 with "MAC5" as the destination MAC address. Though not illustrated, the packet is forwarded by an MPSE in the host machine 601. The MPSE recognizes that "MAC5" is in the host machine 601 so it forwards the packet 680 directly to the VM 615 without going through the physical network 690.

As mentioned, a physical host (PH) is a network node that belongs to a logical network but does not operate a local instance of the logical network's LRE. In some embodiments, network traffic from a PH to a VM is therefore routed by a designated host machine that does operate a local instance of the LRE (i.e., MPRE). However, in some embodiments, the converse is not true. Namely, network traffic from VMs to a PH is always routed locally, in a distributed fashion, by each host machine's own MPRE without relying on a designated host.

FIG. 7 illustrates the distributed L3 routing of data packets from the VMs 611-614 to a PH 695. The packets from the VMs 611-614 are each routed locally at the MPRE of its host machine, even though the destination is a PH 695 that does not operate an instance of the LRE. The VMs 611-614 are being hosted by host machines 601-604, respectively. The host machines 611-614 are communicatively linked with each other by the physical network 690. The physical network 690 also connects the PH 695 with the host machines 601-604. The host machines 601-604 are operating MPREs 631-634, respectively, which are local instances of a LRE of a particular logical network. The PH 695 is a network node that belongs to a same particular logical network as the VMs 611-614, but the PH 695 does not operate the LRE of the particular logical network.

FIG. 7 illustrates four operations labeled '1' through '4' that correspond to four different packet forwarding operations from VMs 611-614 to the PH 695. The host machines hosting these VMs perform the forwarding operations locally by using their own MPREs in each of these four operations. Operation '1' illustrates the routing of a packet 671 from the VM 611 to the PH 695. The VM 611 is hosted by the host machine 601, which is operating the MPRE 631. The MPRE 631 receives the packet 671 at its LIF A (since the VM 611 is a network node at network segment A) and uses its routing table 641 to map the destination IP address 1.1.2.10 to "MAC10", which is the MAC address of the PH 695. The routed packet goes out of LIF B of the MPRE 641 (since the destination IP address 1.1.2.10 indicates that the destination network node is in network segment B). The local MPSE of the host machine 601 then sends the routed packet 671 out to the physical network 690 and then to the PH based on the routed MAC address "MAC10". Operations '3' and '4' likewise illustrate the L3 routing of packet 673 from the VM 613 to the PH 695 and packet 674 from the VM 614 to the PH 695. Each of these routing operations is performed by a local MPRE (633 and 634) in each VM's respective host machine (603 and 604) by using each MPRE's own routing table (643 and 644).

In operations '1', '3', and '4', the MPREs are performing L3 routing operations since the PH 695 is on a different network segment than the VMs 611, 613 and 614. (The IP address of the PH 695 is 1.1.2.10, which makes the PH 695 part of network segment B. The IP address of VM 611 is 1.1.1.1, which is in network segment A. The IP address of VM 613 is 1.1.3.3, which is in network segment C. The IP address of VM 614 is 1.1.4.4, which is in network segment D.) Operation '2', on the other hand, illustrates the forwarding of a packet 672 to the PH 695 from a VM 612 that is in the same segment B as the PH 695 (the VM 612 is at IP address 1.1.2.2, which is also in segment B). If the packet 672 has already specified the destination MAC address (i.e., MAC10), in some embodiments, the MPSE of the host machine 602 would directly forward the packet to the PH 695 via the physical network 690 without routing. If the destination MAC address is unknown, the MPRE 632 in some embodiments would perform a bridging operation to map the destination IP address 1.1.2.10 to the destination MAC address MAC10. MPREs performing bridging operations are described in U.S. patent application Ser. No. 14/137,862.

II. Multiple Addresses Per LIF a. Designated Instances for LIF Addresses

As mentioned, a physical host (PH) is a network node that belongs to a logical network but does not operate a local instance of the logical network's LRE. In some embodiments, network traffic from a PH to a VM is therefore routed by a designated host machine that does operate a local instance of the LRE (i.e., MPRE). The local instance of the LRE running on such a designated host is referred as a "designated instance" or "DI" in some embodiments, because it is a designated MPRE instance used to handle traffic from physical hosts that do not have their own MPREs.

In some embodiments, a logical network (or an LRE) has multiple designated instances for some or all of the network segments. A PH in a network segments with multiple designated instances can choose among the multiple designated instances for sending network traffic to other network nodes in the logical network, for say, load balancing purposes. In order to support multiple designated instances per network segment, a corresponding LIF in some embodiments is defined to be addressable by multiple identifiers or addresses (e.g., IP addresses), where each LIF identifier or address is assigned to a different designated instance. In some embodiments, each LIF identifier serves as a destination address for network traffic. Each designated instance (DI) assigned to a particular LIF identifier in turn handles network traffic for that particular assigned LIF identifier.

Figure 8:
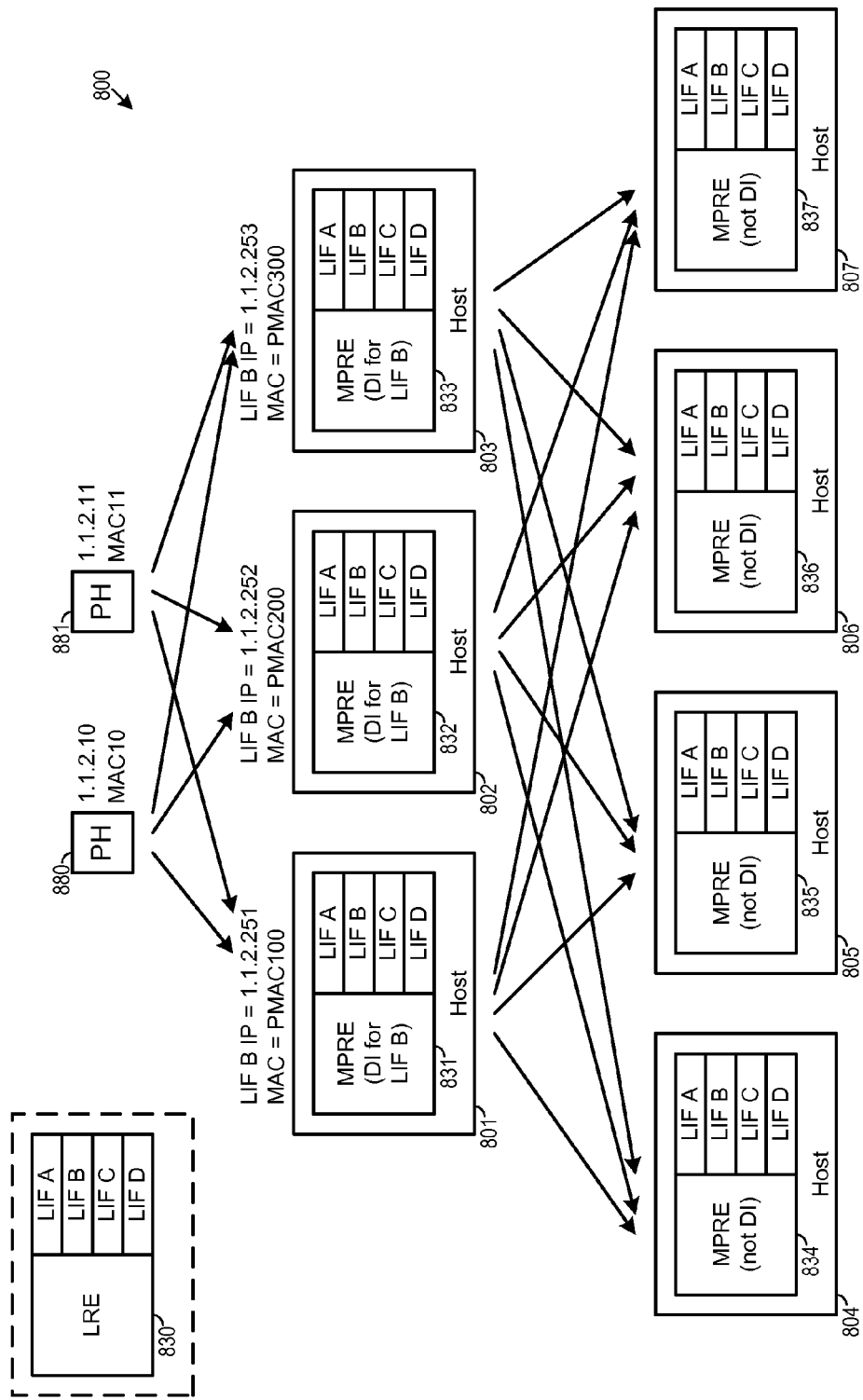
FIG. 8 conceptually illustrates multiple designated instances for a LIF in a logical network.

FIG. 8 conceptually illustrates multiple designated instances for a LIF in a logical network 800. The logical network 800 is implementing a LRE 830 for network segments A, B, C, and, D, and the LRE 830 has LIF A, LIF B, LIF C, and LIF D for serving as interfaces for these four network segments. The logical network 800 is implemented over a network virtualization infrastructure that includes host machines 801-807 interconnected by a physical network 890 (shown in FIG. 9). Each of these host machines is running a local instance of the LRE 830 as its MPRE (i.e., MPREs 831-837).

The logical network 800 also includes two PHs 880 and 881. The PHs do not run their own local instances of the LRE 830 and therefore rely on designated instances for L3 routing within the logical network 800. The IP address of the PH 880 is 1.1.2.10 and the IP address of the PH 881 is 1.1.2.11, which indicates that both PH 880 and the PH 881 are in the network segment B and interfaces the LRE 830 by using LIF B.

In the example of FIG. 8, the LIF B has three IP addresses: 1.1.2.251, 1.1.2.252, and 1.1.2.253. The logical network has three designated host machines (and three DIs) for these three LIF addresses: the MPRE 831 running on the host machine 801 is the DI for the LIF address 1.1.2.251, the MPRE 832 running on the host machine 802 is the DI for the LIF address 1.1.2.252, and the MPRE 833 running on the host machine 803 is the DI for the LIF address 1.1.2.253. The MPREs in host machines 804-807 are not DIs for the LIF B (though not illustrated, they can be DIs for other LIFs). Thus, the host machines 801, 802, and 803 can all serve as designated host machines for performing L3 routing on packets from the PHs 880 and 881.

As mentioned earlier, each MPRE is addressable from network nodes outside of its host machine by a physical MAC address (PMAC), which uniquely identifies the MPRE from other MPREs in other host machines. In some embodiments, the PHs use the PMAC of a designated instance as its first hop L2 destination. In other words, to send a packet to be routed by a DI, a PH would first send the packet to the DI by using the DI's PMAC address. In the example of FIG. 8, the DI in the host machine 801 has PMAC address "PMAC100", the DI in the host machine 802 has PMAC address "PMAC200", and the DI in the host machine 803 has PMAC address "PMAC300".

Figure 9:
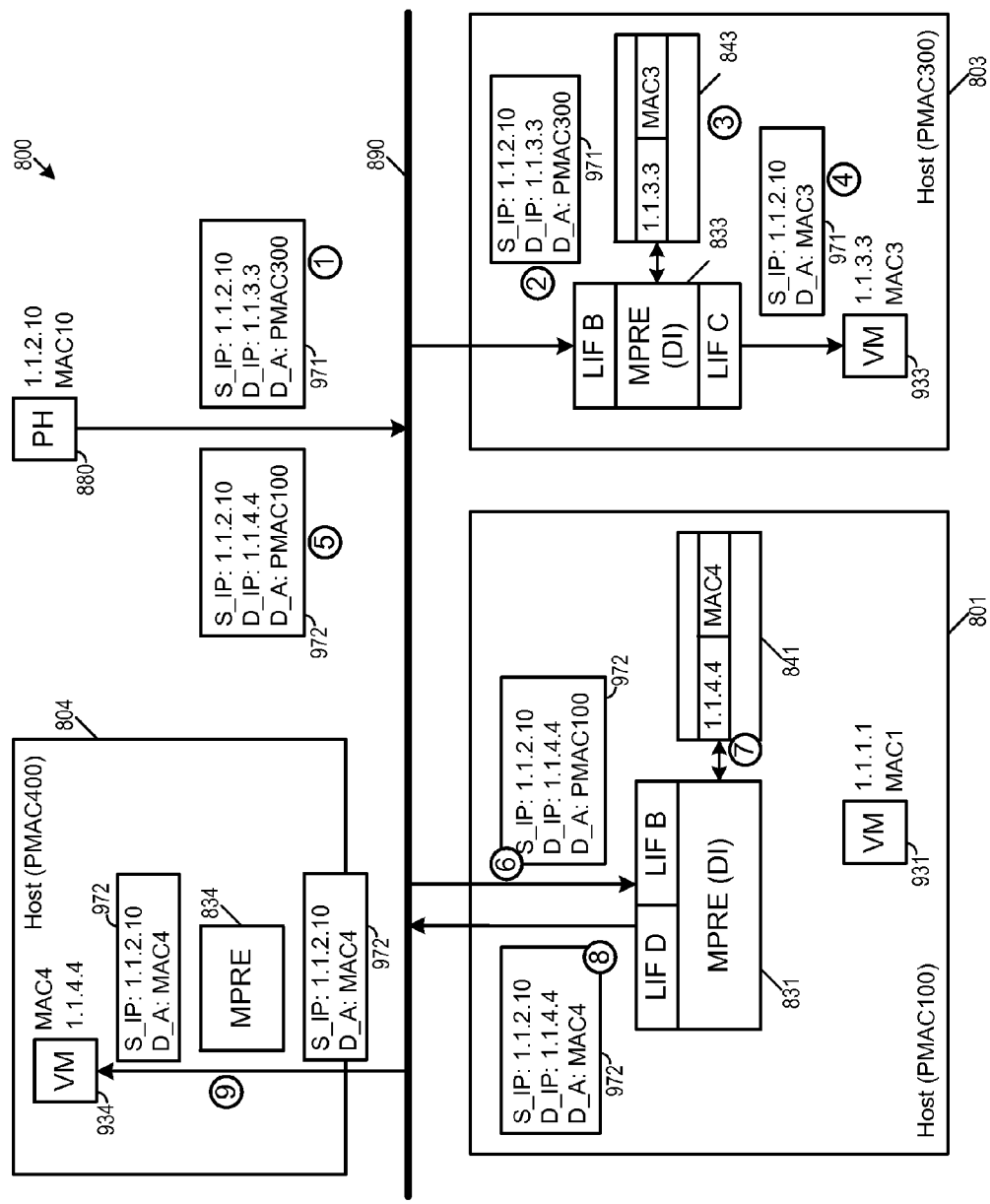
FIG. 9 illustrates L3 routing of packets from a PH to VMs in the logical network by using two different designated instances.

FIG. 9 illustrates L3 routing of packets from the PH 880 to VMs in the logical network 800 by using two different designated instances. The PH 880 is sending a packet 971 destined for IP address 1.1.3.3 and also another packet 972 destined for IP address 1.1.4.4. The PH 880 uses the DI 833 (i.e., the MPRE of the host machine 803) as the first hop for the packet 971 and the DI 831 (i.e., the MPRE of the host machine 801) as the first hop for the packet 972.

Operations labeled '1' through '4' illustrates the routing of the packet 971. At operation '1', the PH 880 sends the packet 971 on to the physical network 890. The packet 971 specifies that it is destined for IP 1.1.3.3 while its first hop MAC address is "PMAC300". At operation '2', the packet 971 reaches the MPRE 833 in the host 803 based on the MAC address "PMAC300", which is the PMAC of the MPRE 833. The packet enters the MPRE 833 through LIF B since the PH 880 is in network segment B (IP address 1.1.2.10). At operation '3', the MPRE 833 uses its routing table 843 to translates the destination IP address 1.1.3.3 to destination MAC address "MAC3". At operation '4', the MPSE (not illustrated) of the host machine 803 recognizes that "MAC3" is the MAC address of a VM 933 running within the host machine 803. The MPSE then forwards the packet 971 to the VM 933.

Operations labeled '5' through '9' illustrates the routing of the packet 972. At operation '5', the PH 880 sends the packet 972 on to the physical network 890. The packet 972 specifies that it is destined for IP 1.1.4.4 while its first hop MAC address is "PMAC100". At operation '6', the packet 972 reaches the MPRE 831 in the host 801 based on the MAC address "PMAC100", which is the PMAC of MPRE 831. The packet enters the MPRE 831 through its LIF B since the PH 880 is in network segment B (IP address 1.1.2.10). At operation '7', the MPRE 831 uses its routing table 841 to translates the destination IP address 1.1.4.4 to destination MAC address "MAC4". At operation '8', the MPSE of the host machine 801 realizes that "MAC4" is not an address for any network node within the host machine 801 and forwards the routed packet 972 out onto the physical network 890. At operation '9', the routed packet 972 with destination "MAC4" reaches the host machine 804, whose MPSE (not illustrated) recognize it as the L2 address of a VM 934 running on that host machine. The MPSE of the host machine 804 then forwards the routed packet 972 to the VM 934, whose IP address is 1.1.4.4.

In some embodiments, different LIFs of a LRE have different sets of IP addresses, and each IP address of a LIF has a corresponding designated instance. FIG. 10 illustrates conceptually illustrates a LRE 1000 in which each LIF has multiple IP addresses, and each IP address has its own corresponding designated instance. The LRE 1000 (LRE X) has four LIFs 1011-1014 for four different network segments. The LIFs 1011 and 1012 are for VLAN network segments (VLAN100 and VLAN200). The LIFs 1013 and 1014 are for VXLAN network segments (VXLAN500 and VXLAN600).

As illustrated, each of LIFs 1011-1014 has multiple IP addresses, and each IP address is associated with a host machine that is operating a local instance of the LRE X (i.e., MPRE) as the designated instance for that IP address. In some embodiments, each IP address of a LIF is associated with a different host machine. As mentioned earlier, in some embodiments, a PMAC of a MPRE is an address that is used to uniquely identify one MPRE in one host machine from other MPREs in other host machines, therefore, IP addresses associated with different PMAC addresses indicates designated instances in different host machines. For example, the LIF 1012 has IP addresses 2.1.2.251, 2.1.2.252, and 2.1.2.253. The LIF IP addresses 2.1.2.251 has a designated instance with PMAC address "11:11:11:11:12:01" or "PMAC4", the LIF IP addresses 2.1.2.252 has a designated instance with PMAC address "11:11:11:11:12:02" or "PMAC5", and the LIF IP addresses 2.1.2.253 has a designated instance with PMAC address "11:11:11:11:12:01" or "PMAC6". The three IP addresses of the LIF 1012 are therefore assigned to MPREs in three different host machines.

In some embodiments, one host machine can serve as the designated host machine (and its MPRE as the designated instance) for multiple different IP addresses from multiple different LIFs. For example, the PMAC address "PMAC1" corresponds to both IP address 2.1.1.251 of the LIF 1011 and IP address 2.1.3.251 of the LIF 1013, i.e., the MPRE having "PMAC1" is serving as the designated instance for both of these LIF IP addresses. Likewise, the PMAC address "PMAC6" corresponds to both IP address 2.1.2.253 of the LIF 1012 and IP address 2.1.4.253 of the LIF 1014. In other words, the MPRE having "PMAC1" is a designated instance (and its host machine the designated host machine) for both VLAN100 and VXLAN500, while the MPRE having "PMAC6" is a designated instance for both VLAN200 and VXLAN600.

Figure 11:
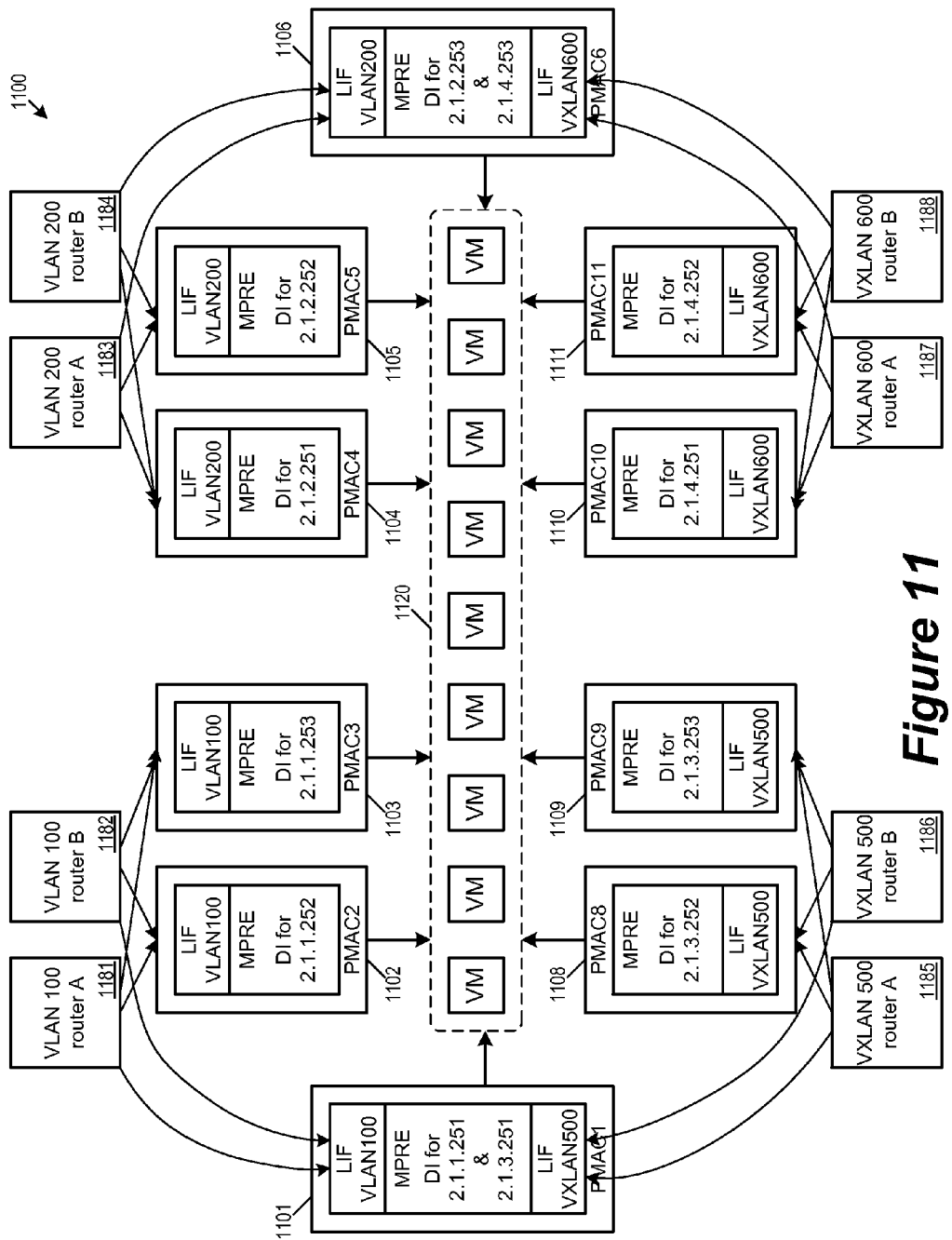
FIG. 11 conceptually illustrates a network virtualization infrastructure having host machines that implement a logical network based on the LRE of FIG. 10.

FIG. 11 conceptually illustrates a network virtualization infrastructure 1100 having host machines that implement a logical network based on the LRE 1000 of FIG. 10. The network virtualization infrastructure 1100 includes a number of host machines, including host machines 1101-1111. These host machines are hosting the VMs 1120. Each host machine is operating a local instance of the LRE 1000 as MPRE. Each host machine is also associated with a PMAC so its MPRE is uniquely addressable within the LRE 1000.

The network virtualization infrastructure 1100 also includes PH 1181-1188, which are not operating a local instance of the LRE 1000. The PH 1181-1182 are in VLAN100, the PH 1183-1184 are in VLAN200, the PH 1185-1186 are in VXLAN500, and the PH 1187-1188 are in VXLAN600.

Some of the host machines, namely, host machines 1101-1111, are operating MPREs that serve as designated instances for handling traffic from the PHs 1181-1188. Specifically, the host machines 1101, 1102, and 1103 are serving as designated host machines for VLAN100 for handing traffic from PHs 1181 and 1182, the host machines 1104, 1105, and 1106 are serving as designated host machines for VLAN200 for handing traffic from PHs 1183 and 1184, the host machines 1101, 1108, and 1109 are serving as designated host machines for VXLAN500 for handing traffic from PHs 1185 and 1186, and the host machines 1110, 1111, and 1106 are serving as designated host machines for VXLAN500 for handing traffic from PHs 1187 and 1188. Though not illustrated, in some embodiments, some of the network segments are inherently distributed so there would be no need for designated instances for handling traffic from physical hosts of those network segments. For example, in some embodiments, some VXLAN network segments have physical hosts that are capable of distributed routing and therefore do not need MPREs in other host machines as designated instances.

Each network segment (and the LIF for that network segment) has its multiple LIF IP addresses assigned to different host machines. For example, the LIF for VLAN200 has three IP addresses 2.1.2.251, 2.1.2.252, and 2.2.253, and each of these IP addresses is assigned to a different host machine (2.1.2.251 is assigned to the host machine 1104, 2.1.2.252 is assigned to the host machine 1105, and 2.1.2.253 is assigned to the host machine 1106). As mentioned earlier by reference to FIG. 10, some host machines serve as designated host machine for different IP addresses from different LIFs/network segments. As illustrated in FIG. 11, the host machine 1101 (PMAC1) is serving as designated host machine (i.e., hosting a designated instance MPRE) for both 2.1.1.251 of VLAN100 and 2.1.3.251 for VXLAN500. The host machine 1106 (PMAC6) is serving as designated host machine for both 2.1.2.253 of VLAN200 and 2.1.4.253 of VXLAN600.

b. Enabling Ingress ECMP Using Multiple LIF Addresses

As mentioned, in some embodiments, having multiple designated instances per LIF gives a physical host using that LIF a list of choices when selecting a next hop. A physical host having such a list is able to select one designated instance as destination, for say, to balance the load across different designated instances. To provide such a list to the physical hosts of a particular network segment, some embodiments advertise the IP addresses of the LIF of that particular network segment as a list of available next hops.

Figure 12:
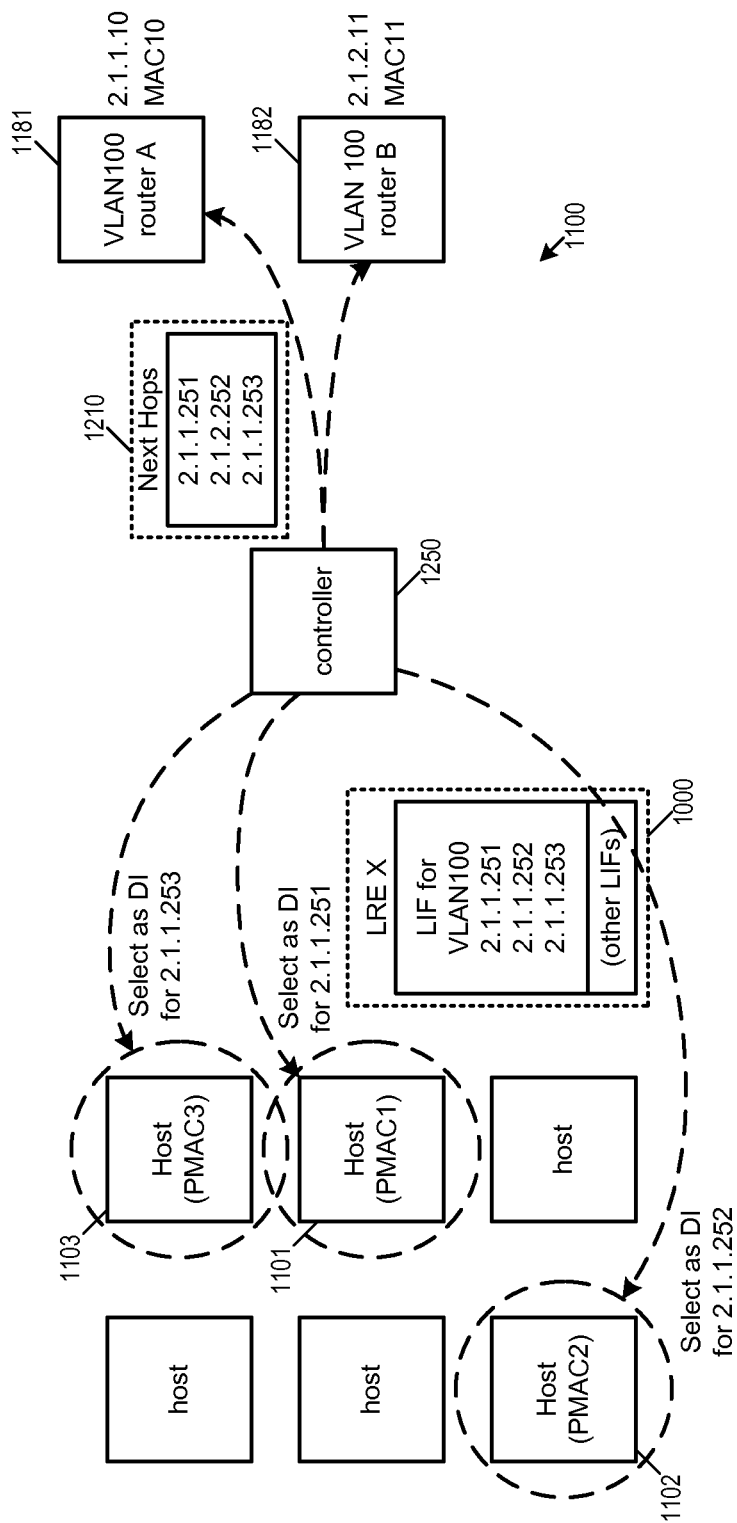
FIG. 12 conceptually illustrates the advertising of LIF IP addresses as a list of next hops to physical hosts in the network virtualization infrastructure.

FIG. 12 conceptually illustrates the advertising of LIF IP addresses as a list of next hops to physical hosts in the network virtualization infrastructure 1100. The network infrastructure 1100 is implementing the LRE 1000, whose LIF for VLAN100 is assigned IP addresses 2.1.1.251, 2.1.1.252, and 2.1.1.253. The physical hosts 1181 and 1182 are both routers in the VLAN100. As illustrated, the network virtualization infrastructure 1100 includes a network controller 1250. The network controller 1250 advertises the LIF IP addresses for VLAN100 as a list of next hops 1210 to the physical hosts 1181 and 1182. The physical hosts can resolve these IP addresses into L2 MAC addresses by perform ARP operations on these LIF IP addresses.

The controller 1250 also selects the host machines to serve as the designated instances/designated host machines for those advertised LIF IP addresses. As illustrated, the controller 1250 selects the host machine 1101 as the designated host (i.e., its MPRE as the designated instance) for the LIF IP address 2.1.1.251, the host machine 1102 as the designated host for the LIF IP address 2.1.1.252, and the host machine 1103 as the designated host for the LIF IP address 2.1.1.253. When the physical hosts subsequently request address resolution for their received next hop IP addresses, some embodiments provide the PMACs of the selected designated instances/designated hosts as the resolved L2 MAC addresses to the requesting physical hosts. Address resolution of LIF IP addresses will be described further below in Section II.c.

Once a list of designated instances is made available to a physical host, the physical host is able to select any one of the designated instances as a next hop into the logical network. Such selection can be based on any number of criteria and can be made for any number of purposes. In some embodiments, a physical host selects a designated instance as the next hop based on current network traffic information in order to balance the traffic load between the different designated host machines. In some embodiments, a PH uses the list of designated instances to perform ECMP (Equal Cost Multi-path Routing) algorithms on ingress network traffic to the logical network.

Figure 13:
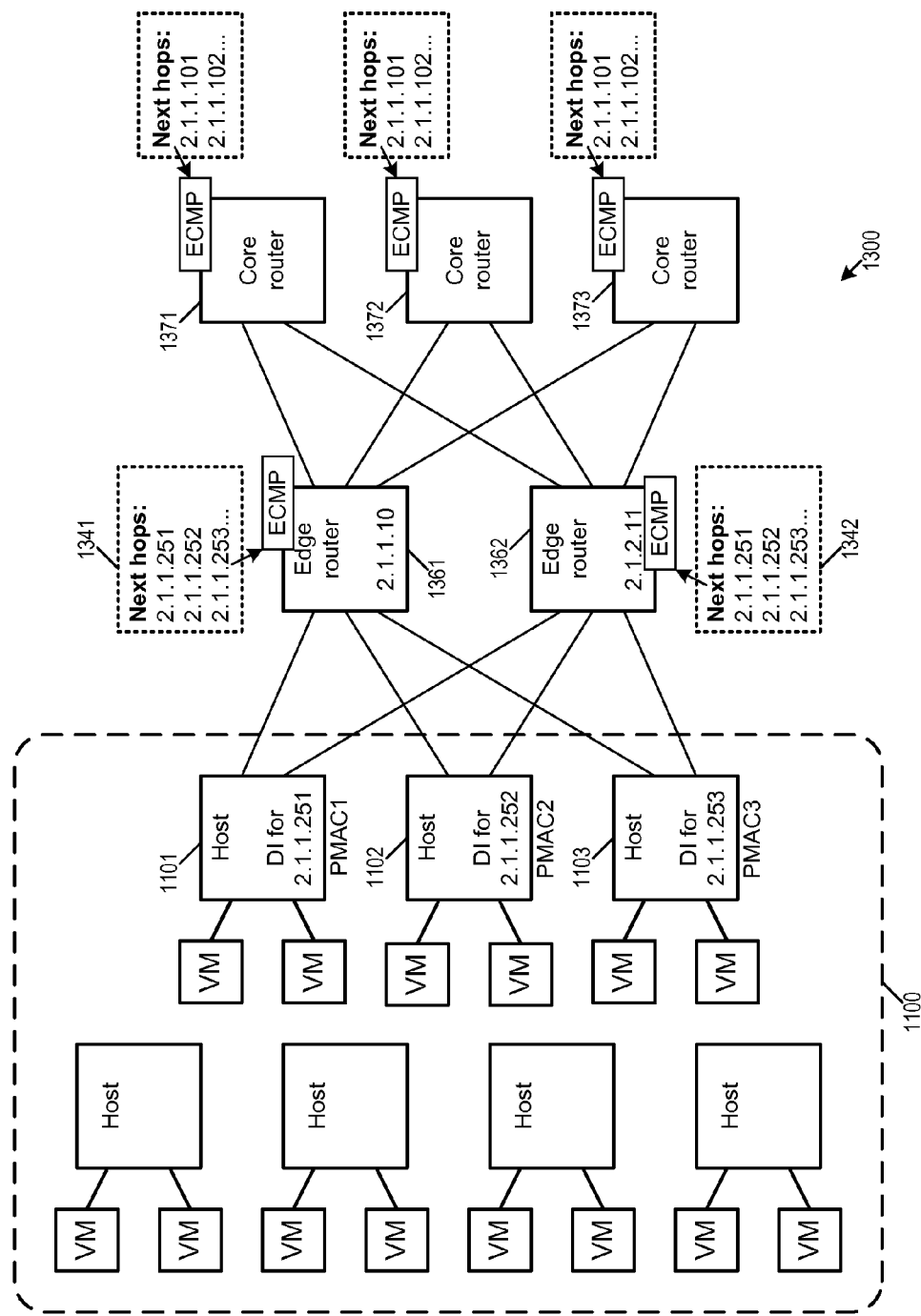
FIG. 13 illustrates a network system in which routers for ingress network traffic into a logical network perform ECMP based on lists of advertised available next-hops.

FIG. 13 illustrates a network system 1300 in which routers for ingress network traffic into a logical network perform ECMP based on lists of advertised available next-hops. The network system 1300 includes the network virtualization infrastructure 1100, edge routers 1361 and 1362, and core routers 1371-1373. The network virtualization infrastructure 1100 is implementing the LRE 1000. The core routers 1371-1373 are routers of the internet backbone at a client site, and the edge routers 1361 and 1362 are gateways for network traffic into the network virtualization infrastructure 1100. The edge routers 1361 and 1362 have received the list 1210 of IP addresses that it can use as the next hop into the virtualization infrastructure 1100. The routers 1361 and 1362 are network nodes in VLAN100, and the list of IP addresses are the LIF IP addresses for VLAN100.

Each of the core routers 1371-1373 performs ECMP algorithms to select one of the edge routers 1361-1362 as the next hop for traffic flowing from the client site towards the network virtualization infrastructure 1100. Each of the edge routers 1361-1362 in turn performs its own ECMP algorithm to select one of the designated instances as the next hop for traffic into the network virtualization infrastructure 1100. In some embodiments, at least some of the routers perform the ECMP algorithms in order to balance the traffic and/or computation load among downstream routers. In some embodiments, such an ECMP algorithm is based on dynamic network traffic status, where the selection of the next hop is cognizant of the current traffic load on each of the designated instances. In some embodiments, the ECMP algorithm selects a next hop by blindly hashing the ingress data packet without regard to any real-time network traffic status.

The edge router 1361 has a list 1341 and the edge router 1362 has a list 1342. Both the lists 1341 and 1342 are derived from the advertised list of LIF IP addresses 1210 that includes 2.1.1.251, 2.1.1.252, and 2.1.1.253. Each of the routers selects a next hop from uses its list of IP addresses. For example, the edge router 1361 uses its list 1341 to perform ECMP and determines that 2.1.1.252 is a better next hop than 2.1.1.251 and 2.1.1.253 for a particular data packet. The edge router 1361 then selects 2.1.1.252 as the destination IP. In the example of FIG. 13, the MPRE running on the host machine 1102 has been selected as the designated instance for the IP address 2.1.1.252, which has L2 address "PMAC2". The particular data packet destined to the IP address 2.1.1.252 will therefore be sent to the host machine 1102 by using the L2 address "PMAC2".

Figure 14:
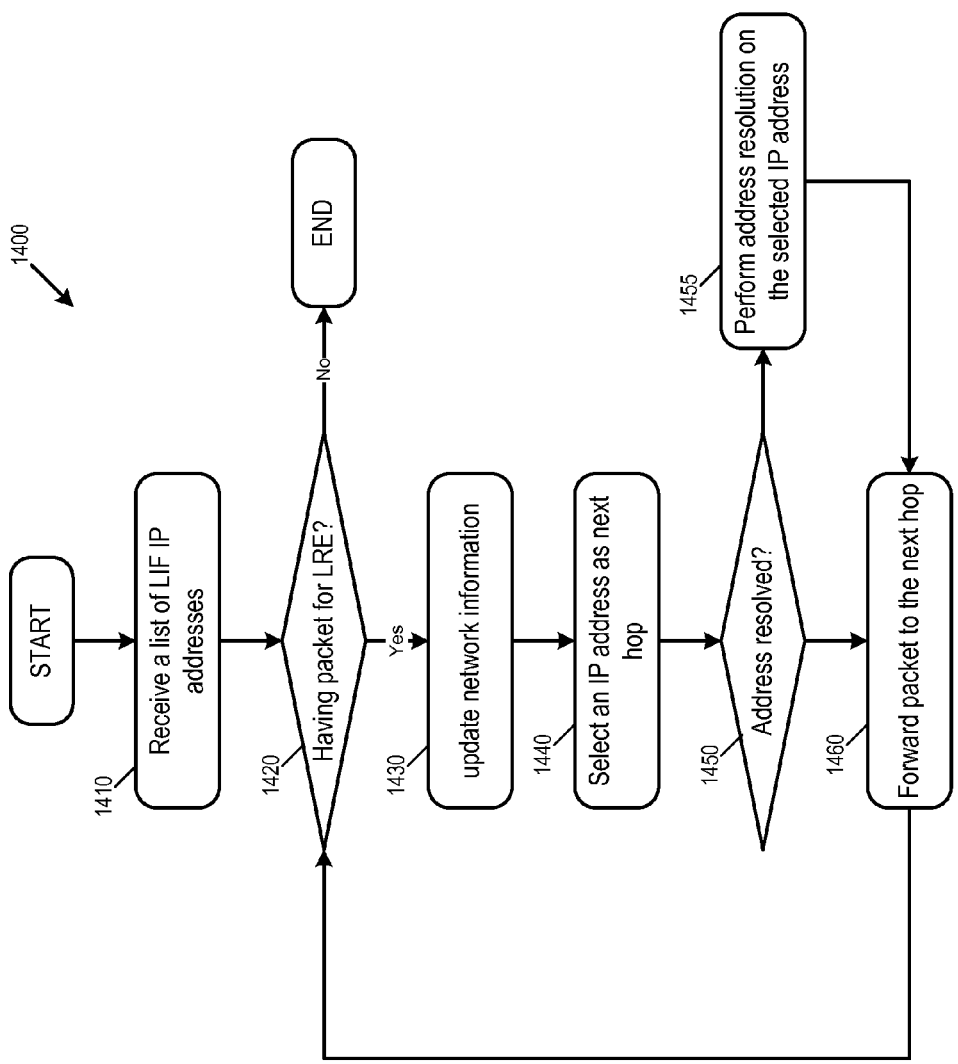
FIG. 14 conceptually illustrates a process performed by a physical host for selecting a designated instance of an LRE for routing.

FIG. 14 conceptually illustrates a process 1400 performed by a physical host for selecting a designated instance of an LRE for routing. The process starts when the physical host receives (at 1410) a list of LIF IP addresses as possible next hops. The process then determines (at 1420) if it has a packet that needs to be routed by the LRE, i.e., a packet whose destination is in the logical network using the LRE. If so, the process proceeds to 1430. Otherwise, the process 1400 ends.

At 1430, the process updates network information. The process then selects (at 1440) an IP address as the next hop. Some embodiments select a next hop based on real time network information update in order to achieve load balancing. Some embodiments do not use such network information update but rather rely on random selection (e.g., simple hashing) to achieve load balancing. Some embodiments use other types of ECMP algorithms for selecting a next hop.

The process next determines (at 1450) whether the selected next hop IP address has a corresponding resolved L2 address. The resolved L2 address is the actual MAC address of the host machine that is chosen as the designated host (and hosting the designated LRE instance) for the next hop IP address. If the selected next hop has a resolved L2 address, the process proceeds to 1460 to forward the packet. Otherwise, the process performs (at 1455) address resolution operation in order to resolve the selected next hop IP address (e.g., by sending ARP request for the selected next hop IP address).

Once the next IP address has been resolved into an L2 address, the process forwards (1460) the packet by using the resolved L2 address. The process 1400 then returns to 1420 to see if there is another packet to be forwarded by the LRE. The resolution of addresses by designated instances will be further described in Section II.c below.

Figure 15:
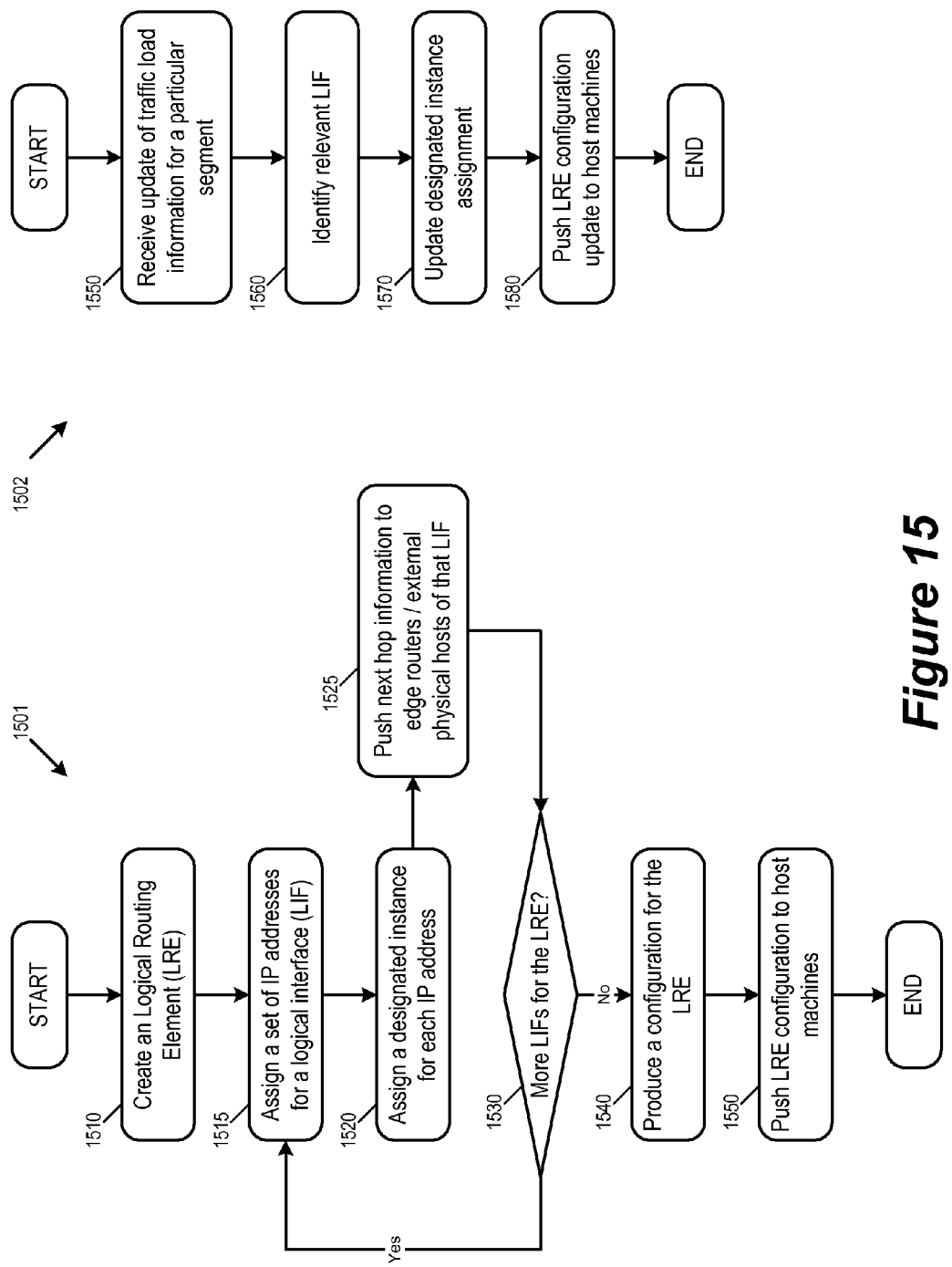
FIG. 15 conceptually illustrates a process for providing multiple designated instances to external physical host machines.

FIG. 15 conceptually illustrates a process 1501 for providing multiple designated instances to external physical host machines. The process 1501 creates an LRE and provides a list of LIF IP addresses as next hops to the external host machines. It also selects host machines to serve as designated instances. The process 1501 starts by creating (at 1510) an LRE for a logical network for a particular client. The LRE includes different LIFs for interfacing with different network segments.

The process then assigns (at 1515) a set of IP addresses for a LIF. Next, the process assigns (at 1520) a designated instance to each IP address of the LIF. Each designated instance is an MPRE residing on a host machine. The process then advertises (at 1525) the list of IP address for the LIF as a list of available next hops to external host machines (e.g., edge routers) connected to that LIF. The process then repeats 1515 through 1525 until it determines (at 1530) that all LIFs in the LRE have a set of IP addresses and a set of corresponding designated instances. In some embodiments, each LIF is assigned a unique set of IP addresses and no two LIFs share a same IP address. In some embodiments, an MPRE of a host machine can serve as the designated instance for two or more different IP addresses from different LIFs.

Once the designated instances for the LIF IP addresses have been chosen, the process produces (at 1540) a configuration for the LRE. The process then pushes (1545) the LRE configuration to each of the host machines in the network virtualization infrastructure. Some of the host machines receiving the configuration would learn that it has been chosen as a designated host machine (i.e., having a designated instance MPRE) and perform the functions of a designated instance. The configuration of an LRE will be described further in Section III below. The process 1501 then ends.

FIG. 15 also conceptually illustrates a process 1502 for dynamically updating assignment of designated instances after the list of LIF IP addresses has already been pushed to the external physical routers. The process 1502 starts when it receives (at 1550) update of traffic load information for a particular network segment. Such information in some embodiments provides status of the network traffic flow in each network segment as well as the network/computation load on each of the host machines. The process then identifies (at 1560) a LIF for a network segment for which it is necessary to change the assignment of designated instances. Next, the process updates (1570) the assignment of designated instances for that LIF based on the updated traffic load information. Finally, the process pushes (at 1580) updated configuration to the host machines in order to inform the host machines of the new designated instance assignment. The process 1502 then ends. The physical hosts can then perform ARP on their next hop IP address to find out the PMAC address of the newly selected designated instances.

c. Address Resolution Using Multiple LIF Addresses

The routing operations illustrated in FIGS. 7 and 9 rely on routing table entries in MPREs for translating L3 IP addresses into L2 MAC addresses. Packets coming from physical hosts (PHs) in particular rely on routing table entries in designated instances for routing. In some embodiments, these entries are filled by address resolution protocols (ARP) initiated by PHs or by DIs themselves. Furthermore, a PH that has received a list of IP addresses as next hops (such as the routers 1181, 1182, 1361 and 1362 in FIGS. 12 and 13) also performs ARP operation to translate the received L3 IP address into L2 MAC addresses in some embodiments. In other words, in order to use the received LIF IP addresses as next hops, a PH in some embodiments performs ARP in order to ascertain the PMAC addresses of the designated instances.

Figure 16:
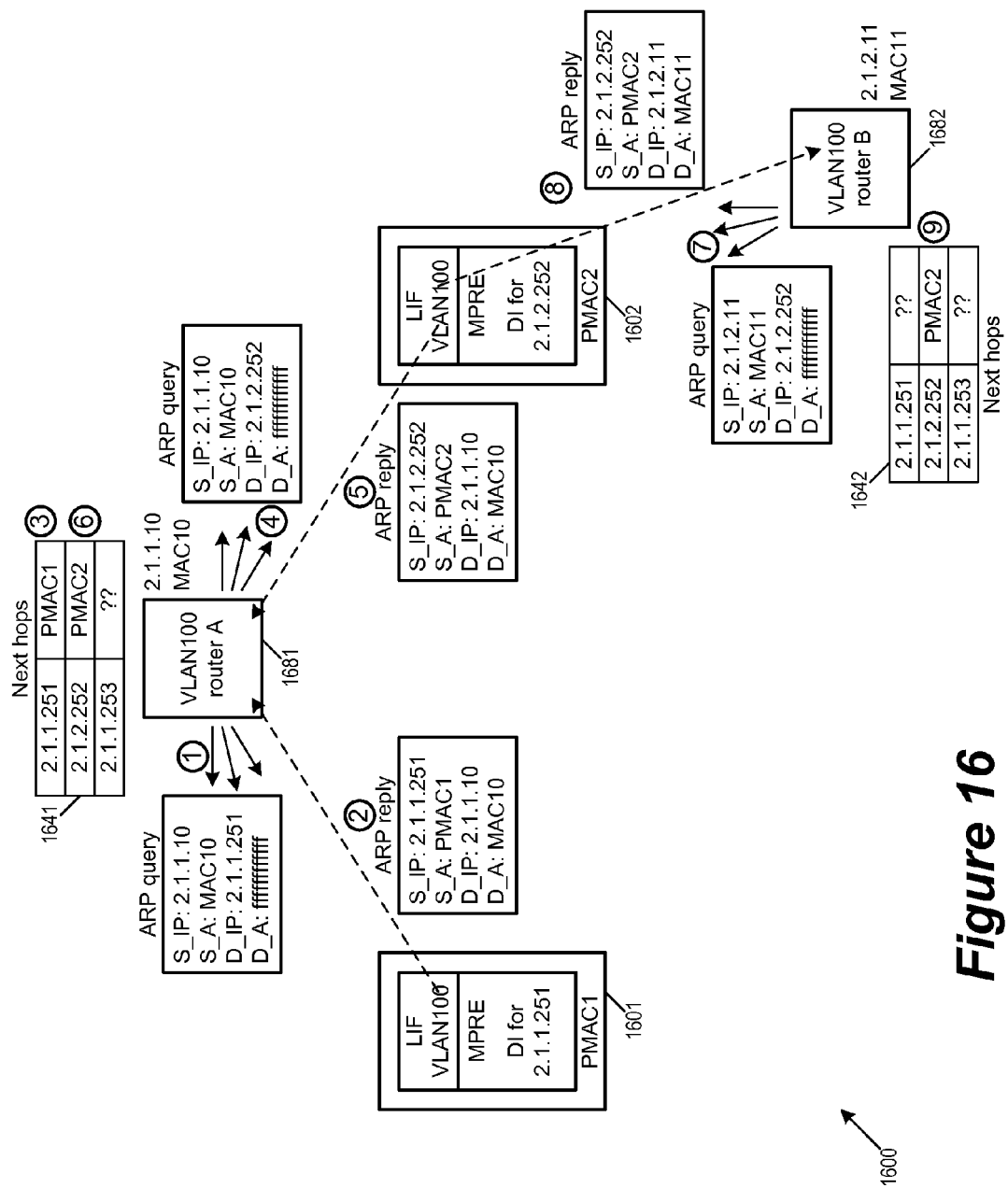
FIG. 16 illustrates ARP operations for resolving LIF IP addresses advertised to the PHs.

For some embodiments, FIG. 16 illustrates ARP operations for resolving LIF IP addresses advertised to the PHs. The figure illustrates ARP operations by PHs 1681 and PH 1682. The PHs 1681 and 1682 have each received a list of next hops from a logical network 1600. The PHs 1681 and 1682 are both network nodes in a network segment VLAN100, and the list provides a list of IP address for the LIF of VLAN100, which includes 2.1.1.251, 2.1.2.252, and 2.1.1.253. The PH 1681 is maintaining a routing table 1641 and the PH 1682 is maintaining a routing table 1642.

The logical network 1600 is implemented over an array of host machines, including host machines 1601 and 1602. The logical network 1600 is implementing an LRE 1650, and the host machines of the logical network, including the host machines 1601 and 1602, are each running a local instance of the LRE 1650 as its MPRE. The PMAC address of the host machine 1601 is "PMAC1", and its MPRE has been chosen as the designated instance for the LIF address 2.1.1.251. The PMAC address of the host machine 1602 is "PMAC2", and its MPRE has been chosen as the designed instance for the LIF address 2.1.2.252.

FIG. 16 illustrates the ARP operations by PHs for resolving the LIF IP addresses in nine operations labeled '1' through '9'. At operation '1', the PH 1681 selects the IP address 2.1.1.251 as a next hop, but its routing table 1641 does not have an entry for 2.1.1.251. The PH 1681 in turn broadcast an ARP query message for the IP address 2.1.1.251 by using "ffffffffffff" as destination MAC address. At operation '2', the host machine 1601 receives the ARP query broadcast. Realizing that it is the designated instance for the IP address 2.1.1.251, it sends an ARP reply to the PH 1681 indicating that the MAC address for the IP addresses is "PMAC1". At operation '3', the PH 1681 receives the ARP reply and updates its routing table entry for 2.1.1.251 with "PMAC1".

At operation '4', the PH 1681 selects the IP address 2.1.2.252 as a next hop, but its routing table 1641 does not have an entry for the 2.1.2.252. The PH 1681 in turn broadcast an ARP query message for the IP address 2.1.2.252. At operation '5', the host machine 1602 receives the ARP query broadcast. Realizing that it is the designated instance for the IP address 2.1.2.252, it sends an ARP reply to the PH 1681 indicating that the MAC address for the IP addresses is "PMAC2". At operation '6', the PH 1681 receives the ARP reply and updates its routing table entry for 2.1.2.252 with "PMAC2". After operations '1' through '6', the router 1681 will be able to use the MPREs of the host machines 1601 and 1602 for routing.

At operation '7', the PH 1682 also selects the IP address 2.1.2.252 as a next hop, but its routing table 1642 does not have an entry for the 2.1.2.252. The PH 1682 in turn broadcast an ARP query message for the IP address 2.1.2.252. At operation '8', the host machine 1602 receives the ARP query broadcast. Realizing that it is the designated instance for the IP address 2.1.2.252, it sends an ARP reply to the PH 1682 indicating that the MAC address for the IP addresses is "PMAC2". At operation '9', the PH 1682 receives the ARP reply and updates its routing table entry for 2.1.2.252 with "PMAC2". After operations '7' through '9', router 1682 will be able to use the MPRE of the host machine 1602 for routing.

Figure 17A:
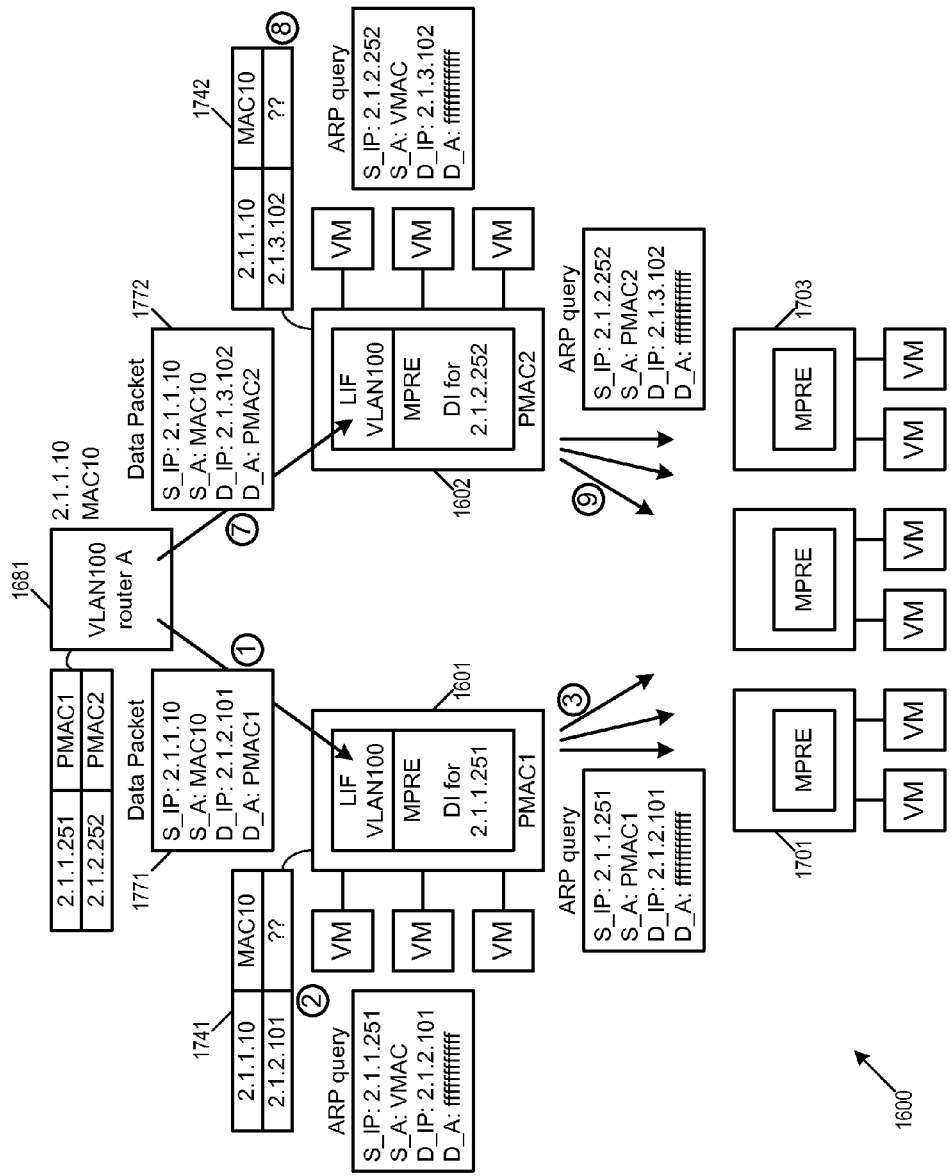
FIG. 17a-b illustrates multiple designated instances acting as ARP proxies when they receive data packets with unknown destination IP addresses from a PH.
Figure 17B:
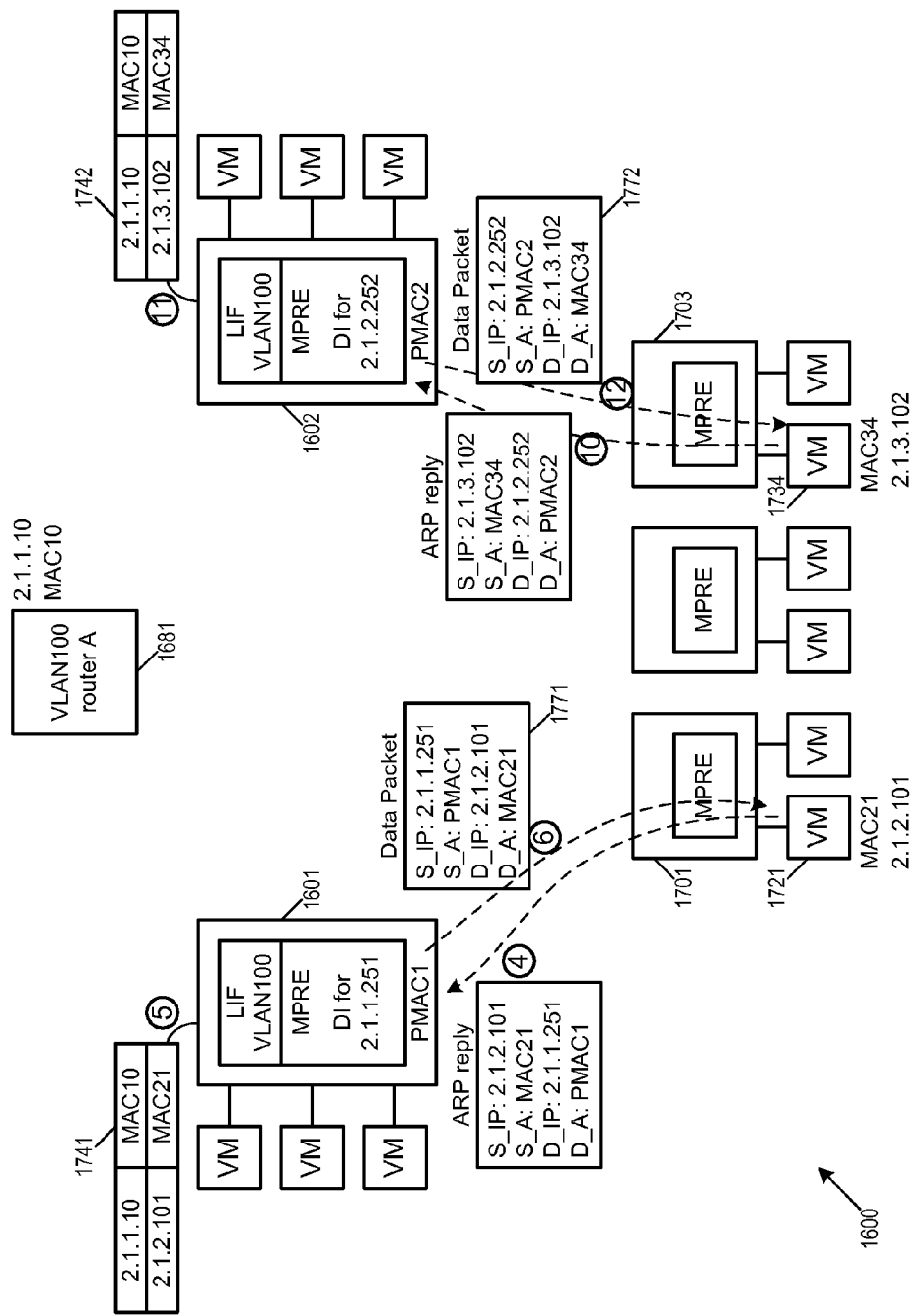

In some embodiments, the designated instances also serve as ARP proxies. In some embodiments, a designated instance performs ARP of its own if it is not able to resolve a destination IP address. FIG. 17*a-b* illustrates the designated instances 1601 and 1602 acting as ARP proxies when they receive data packets with unknown destination IP addresses from the PH 1681. As illustrated, the PH 1681 has already resolved its next hop LIF IP addresses 2.1.1.251 and 2.1.2.252 into "PMAC1" and "PMAC2" from previous ARP operations (i.e., the operations illustrated in FIG. 16). The PH 1681 is therefore able to select either "PMAC1" or "PMAC" for routing. In some embodiments, such a selection is based on ECMP algorithm for load balancing purposes as discussed above in Section II.b.

In operations labeled '1' to '12', FIGS. 14*a-b* illustrates the routing of packets 1771 and 1772 to VMs 1721 and 1734 through designated instances in host machines 1601 and 1602. At operation '1', the PH 1681 sends packet 1771. The packet 1771 has "PMAC1" as its destination address and "2.1.2.101" as its destination IP address. The MAC address "PMAC1" corresponds to the MPRE of the host machine 1601. The PH 1681 at this operation has selected 2.1.2.101 (PMAC1) over 2.1.3.102 (PMAC2) according to a selection algorithm (e.g., ECMP for load balancing), even though both IP addresses of the LIF for VLAN100 has been resolved.

At operation '2', the host machine 1601 receives the packet 1771 based on the MAC address "PMAC1", but its routing table 1741 cannot resolve the IP address 2.1.2.101. At operation '3', the MPRE of the host machine 1601 broadcast an ARP query for the destination IP address 2.1.2.101.

At operation '4', the MPRE of a host machine 1701 replies to the ARP query because the host machine 1701 is hosting a VM 1721, whose IP address is 2.1.2.101. The ARP reply indicates that the MAC address for 2.1.2.101 is "MAC21". At operation '5', the host machine 1601 receives the ARP reply and updates its routing table 1741 for the entry for 2.1.2.101. At operation '6', having resolved the destination IP address 2.1.2.101 for the packet 1771, the host machine 1601 sends the data packet 1771 to the host machine 1701 and to the VM 1721 by using "MAC21" as the destination address.

At operation '7', after sending the packet 1771 to the designated instance for 2.1.1.251 (PMAC1), the PH 1681 sends the packet 1772 to the designated instance for 2.1.2.252 (PMAC2). The packet 1772 has "PMAC2" as its destination address and "2.1.3.102" as its destination IP address. The MAC address "PMAC2" corresponds to the MPRE of the host machine 1602. The PH 1681 at this operation has selected 2.1.3.102 (PMAC2) over 2.1.2.101 (PMAC1) according to a selection algorithm (e.g., ECMP for load balancing), even though both IP addresses of the LIF for VLAN100 has been resolved.

At operation '8', the host machine 1602 receives the packet 1772 based on the MAC address "PMAC2", but its routing table 1742 cannot resolve the IP address 2.1.3.102. At operation '9', the MPRE of the host machine 1602 broadcast an ARP query for the destination IP address 2.1.3.102. At operation '10', the MPRE of a host machine 1703 replies to the ARP query because the host machine 1703 is hosting a VM 1734, whose IP address is 2.1.3.102. The ARP reply indicates that the MAC address for 2.1.3.102 is "MAC34". At operation '11', the host machine 1602 receives the ARP reply and updates its routing table 1742 for the entry for 2.1.3.102. At operation '12', having resolved the destination IP address 2.1.3.102 for the packet 1772, the host machine 1602 sends the data packet 1772 to the host machine 1703 and to the VM 1734 by using "MAC34" as the destination address.

Figure 18:
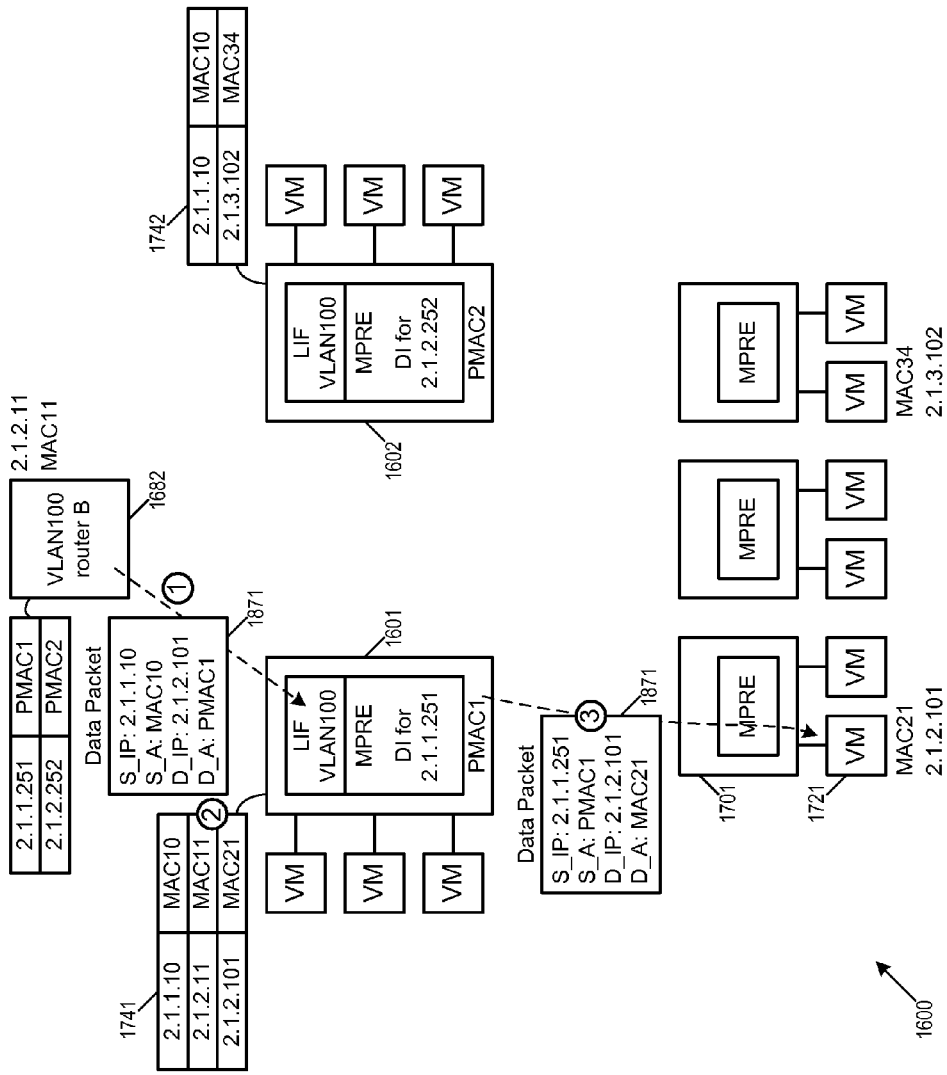
FIG. 18 illustrates a designated instance using its existing routing table entry to route a data packet from a PH without initiating an ARP operation.

Once the routing table of a designated instance has an MAC address resolution for a destination IP address, any subsequent data packet having the same destination IP address can use the resolved MAC address and would not cause the designated instance to initiate another ARP request for that same destination IP address. FIG. 18 illustrates the designated instance 1601 using its existing routing table entry to route a data packet 1871 from the other PH 1682 without initiating an ARP operation. As illustrated, the routing table 1741 of the host machine 1601 already has an address resolution entry for 2.1.2.101 as "MAC21" from a previous ARP operation (i.e., the operations illustrated in FIG. 17*a-b*). In operations labeled '1' to '3', the figure illustrates the routing of the packet 1871 from the PH 1682 to the VM 1721.

At operation '1', the PH 1682 sends the packet 1871. The packet 1871 has "PMAC1" as its destination address and "2.1.2.101" as its destination IP address. The MAC address "PMAC1" corresponds to the MPRE of the host machine 1601. At operation '2', the host machine 1601 receives the packet 1871 based on the MAC address "PMAC1", and its routing table 1741 already has an entry for resolving the IP address 2.1.2.101 into "MAC21". The routing table 1741 also adds an entry based on the packet's source IP address and MAC address (i.e., 2.1.2.11 and "MAC11" of the PH 1682) for future use. At operation '3', the host machine 1601 sends the data packet 1871 to the host machine 1701 and to the VM 1721 by using "MAC21" as the destination address.

Figure 19:
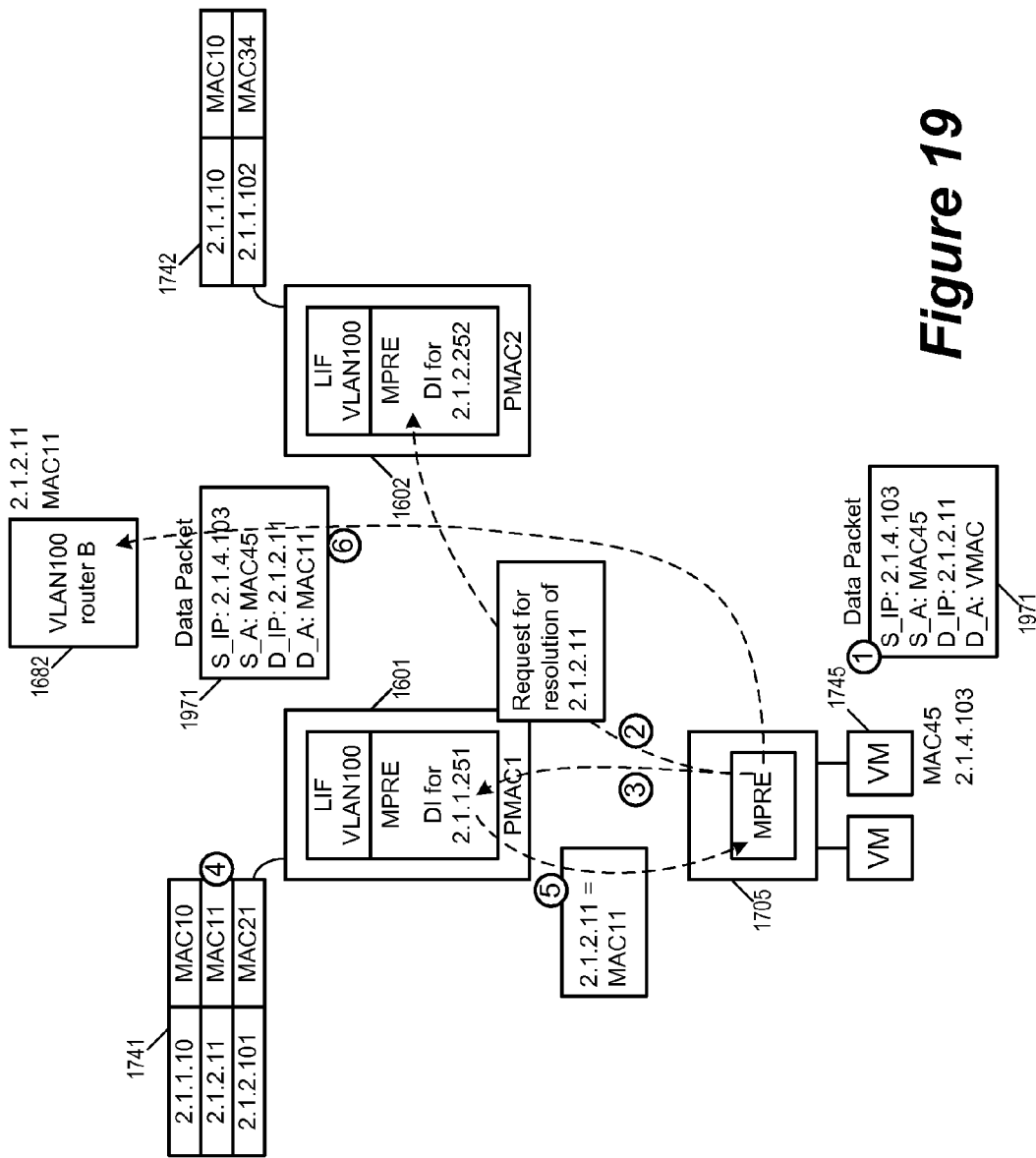
FIG. 19 illustrates the routing of a packet from a VM in a host machine operating a MPRE to a physical host that is not operating a MPRE.

In some embodiments, the designated instances not only resolve IP addresses for packets that comes from external PHs, but also for packets coming from host machines running a local instance of the LRE. FIG. 19 illustrates the routing of a packet 1971 from a VM 1745 in a host machine 1705 operating a MPRE to a physical host that is not operating a MPRE. The routing utilizes routing table entries in the available designated instances 1601 and 1602 for the LIF VLAN100. The routing table 1741 of the host machine 1601 already has an entry for 2.1.2.11 as "MAC11" from a previous routing operation (i.e., the routing of the packet 1871 from the PH 1682 in FIG. 18).

In operations labeled '1' through '6', FIG. 19 illustrates the routing of the packet 1971 from the VM 1745 to the PH 1682. At operation '1', a VM 1745 running on a host machine 1705 is sending the data packet 1971, which has a destination IP 2.1.2.11 and destination MAC address "VMAC". As mentioned earlier, "VMAC" is the MAC address used by a VM when addressing its own local MPRE. Since the MPRE in the host machine 1705 is not able to resolve the destination IP address 2.1.2.11, the host machine 1705 sends out a request for resolution to the designated instances 1601 and 1602 at operations '2' and '3', respectively.

In some embodiments, an MPRE that needs to resolve a destination IP address would make a request for address resolution to a designated instance. In some embodiments, an MPRE would make such an address resolution request to a designated instance that is associated with a LIF address that is in same IP subnet as the destination IP address. In the example of FIG. 19, the host machine 1602 is a designated instance for the IP address 2.1.2.252, which is in the same IP subnet as destination address 2.1.2.11. The MPRE in the host machine 1705 therefore makes the address resolution request to the designated instance 1602 rather than to 1601, whose IP address 2.1.1.251 is in a different IP subnet. In some embodiments, each designated instance is for resolving IP addresses that are in the same subnet as its assigned LIF IP address.

The host machine 1601 at operation '4' examines its routing table and found an entry for the IP address 2.1.2.11 as "MAC11" and replies to the MPRE in the host machine 1705 in operation '5'. Finally, at operation '6', the MPRE of the host machine 1705 sends the data packet 1671 to the PH 1682 by using the MAC address "MAC11", which is the MAC address of the PH 1682.

Figure 20:
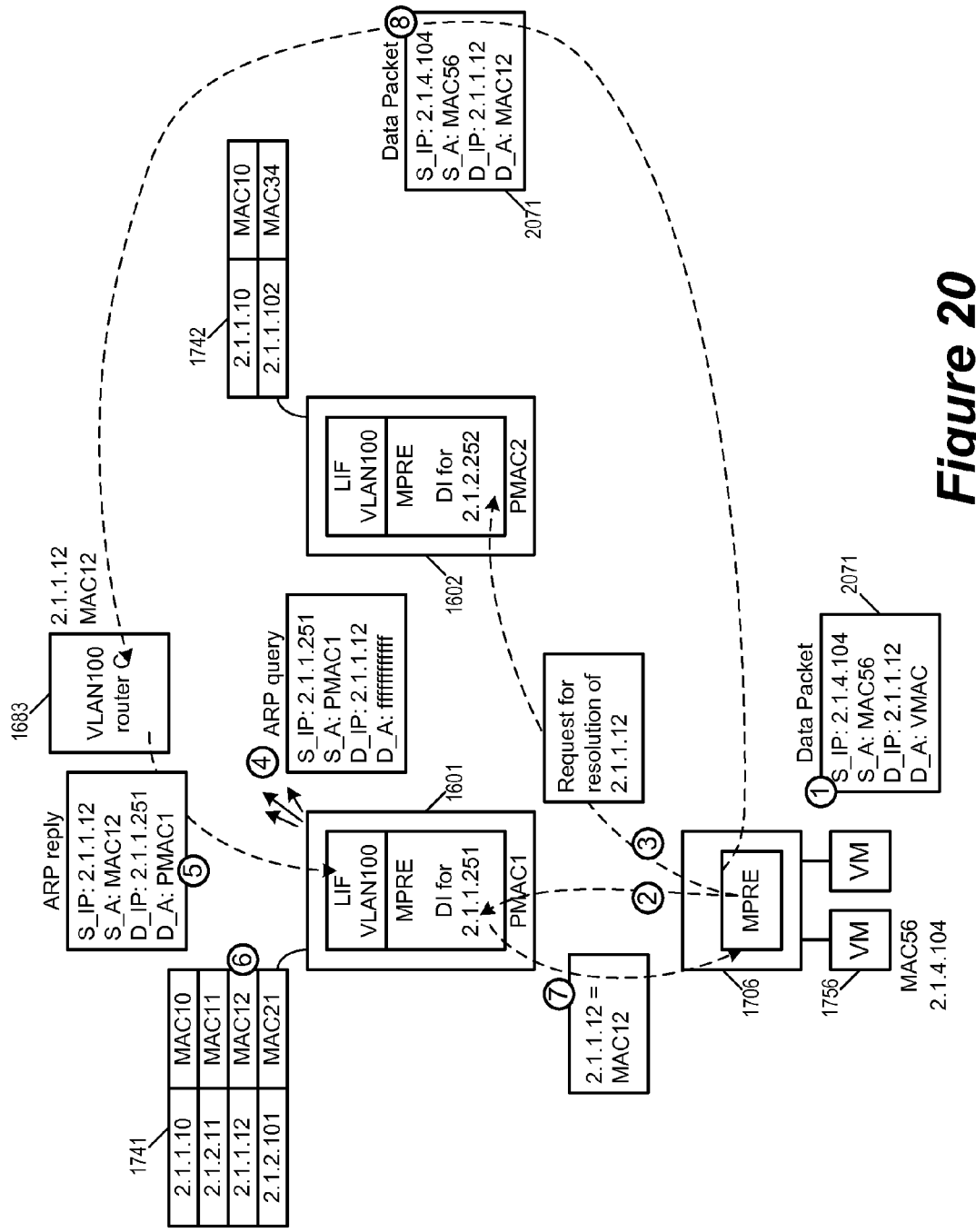
FIG. 20 illustrates an ARP operation performed by a designated instance when it is unable to resolve an IP address upon receiving an address resolution request.

In some embodiments, the address resolution requests to designated instances and address resolution replies from designated instances are UDP messages. In the example of FIG. 19, one of the designated instances has a routing table entry for the destination IP address, and was therefore able to reply to the address resolution request with its own routing table entry. In some embodiments, when a designated instance is not able to resolve a destination IP address upon receiving an address resolution request, it will perform an ARP operation in order to resolve the unknown IP address. FIG. 20 illustrates an ARP operation performed by a designated instance when it is unable to resolve an IP address upon receiving an address resolution request.

FIG. 20 illustrates the routing of a packet 2071 from a VM 1756 to a PH 1683, which is also a physical host in VLAN100 and connected to the LRE by a LIF for the network segment VLAN100. Its IP address is 2.1.1.12 and its MAC address is "MAC12". This MAC address is unknown to the designated instances 1601 and 1602. In other words, if a designated instance receives an address resolution request for the IP address 2.1.1.12, it would perform an ARP operation.

In operations labeled '1' through '8', FIG. 20 illustrates the routing of a packet 2071 from the VM 1756 to the PH 1683. At operation '1', the VM 1756 running on a host machine 1706 is sending the data packet 2071, which has a destination IP 2.1.1.12 and destination MAC address "VMAC". As mentioned earlier, "VMAC" is the MAC address used by a VM when addressing its own local MPRE. Since the MPRE in the host machine 1706 is not able to resolve the destination IP address 2.1.1.12, it sends out a request for resolution to the designated instances 1601 and 1602 in operations '2' and '3' respectively. In the example of FIG. 20, the host machine 1601 is a designated instance for the IP address 2.1.1.251, which is in the same IP subnet as destination address 2.1.1.12. The MPRE in the host machine 1706 therefore makes the address resolution request to the designated instance 1601 rather than 1602, whose IP address 2.1.2.252 is in a different IP subnet.

At operation '4', the host machine (designated instance) 1601 examines its routing table and realizes that it does not have an entry for resolving IP address 2.1.1.12. It therefore broadcasts an ARP request for the IP address 2.1.1.12. At operation '5', the PH 1683, whose IP address is 2.1.1.12, replies to the ARP request with its MAC address "MAC12". At operation '6', the designated instance 1601 receives the ARP reply from the PH 1683, and updates its own routing table 1741. At operation '7', the designated instance 1601 sends address resolution reply message to the MPRE in the host machine 1706, informing the MPRE that the MAC address for the IP address 2.1.1.12 is "MAC12". At operation '8', the MPRE in the host machine 1756 forwards the packet 2071 to the PH 1683 by using "MAC12" as the destination MAC address.

In the examples of FIGS. 19 and 20, the packets being routed (1971 and 2071) are sourced by VMs operating on host machines that are not designated instances (VMs 1745 and 1756 running on host machines 1705 and 1706). However, one of ordinary skill would understand that the operations illustrated in FIGS. 19 and 20 can also be performed for a VM that is operating on a designated instance host machine.

Figure 21:
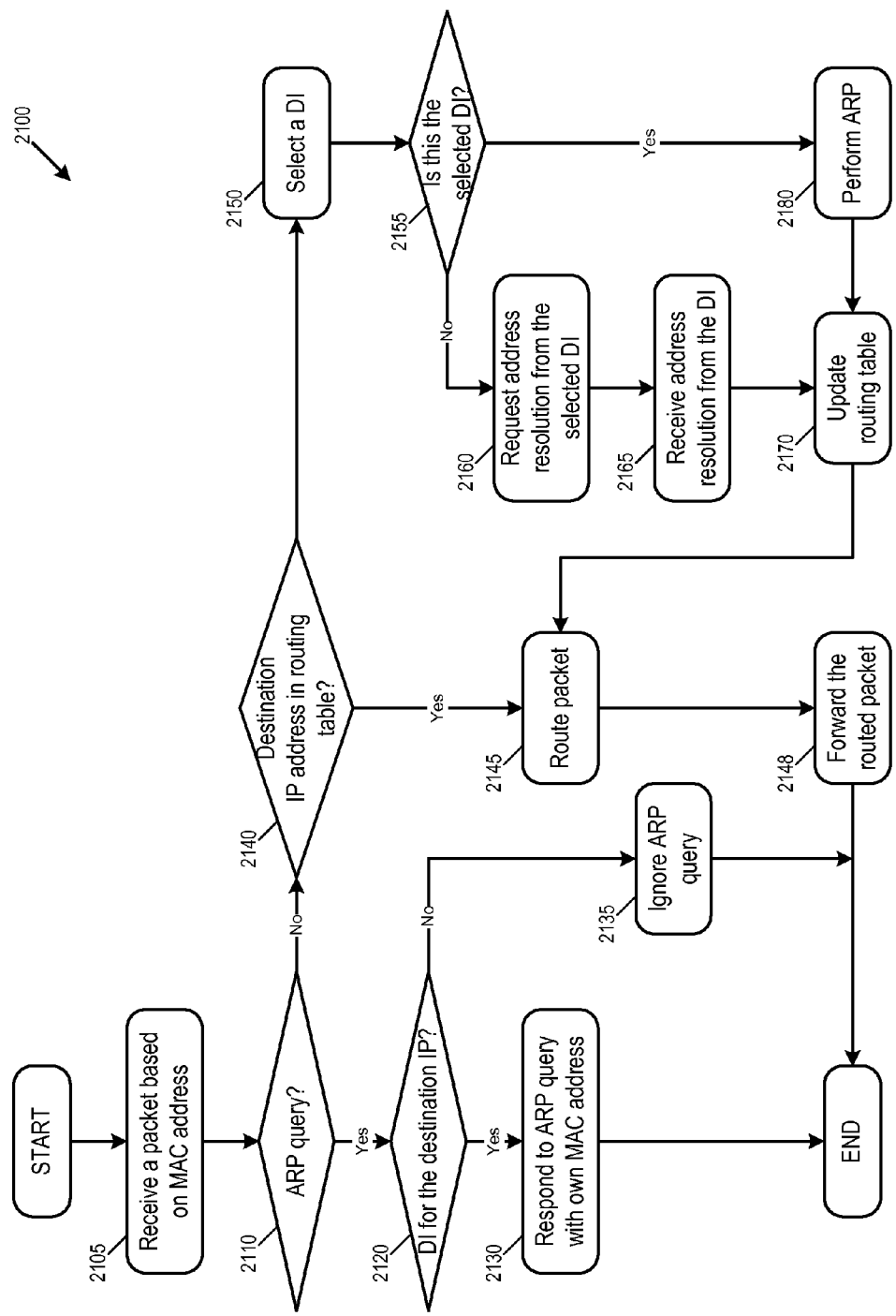
FIG. 21 conceptually illustrates a process for processing a data packet at an MPRE.

For some embodiments, FIG. 21 conceptually illustrates a process 2100 for processing a data packet at an MPRE. In some embodiments, the process 2100 is performed by MPREs that are designated instances as well as MPREs that are not designated instances. The process 2100 starts when it receives (at 2105) a packet based on a destination MAC address. The destination MAC address can either be a broadcast MAC address (e.g., ffffffffffff) or the MAC address of the receiving MPRE (i.e., its PMAC address or the generic VMAC address of all MPREs). The process then determines (at 2110) whether the packet is an ARP query for an IP address. If the packet is an ARP query, the process proceeds to 2120. Otherwise, the process proceeds to 2140.

At 2120, the process examines if this MPRE is a designated instance of the IP address being ARP-queried. If this MPRE is the designated instance for the IP address being ARP-queried, the process responds (at 2130) to the ARP query with its own unique PMAC address and ends. Otherwise the process 2100 ignores (at 2135) the ARP query and ends.

At 2140, the process determines if the destination IP address is in the routing table of the MPRE. If the destination IP address is not in the routing table, the process proceeds to 2150. If the destination IP is in the routing table, the process routes (at 2145) the packet by using the routing table entry for the destination IP address to find the corresponding MAC address. The packet then forwards (at 2148) the packet by using the MAC address as the destination address for the packet. This forwarding operation is performed by using the MPSE of the host machine in some embodiments. The process 2100 then ends.

At 2150, the process selects a designated instance for resolving the IP address. As mentioned, in some embodiments, each LIF has multiple IP addresses, and each of the IP addresses is assigned to a designated instance. In some embodiments, the process would make the address resolution request to a designated instance that corresponds to a LIF IP address that is in the same IP subnet as the destination IP address. The process then determines (at 2155) if this MPRE is itself the selected designated instance. If this MPRE is the selected designated instance itself, process proceeds to 2180. If this MPRE is not the selected designated instance, or is not a designated instance at all, the process requests (at 2160) address resolution from the selected designated instance. The process then receives (at 2165) the address resolution from the designated instance. In some embodiments, such address resolution requests and replies are transmitted as UDP messages between the designated instance and the host machine requesting the address resolution. The process then updates (at 2170) the routing table of the MPRE based on the received address resolution, and proceeds to 2145 to route the data packet.

At 2180, the process performs ARP operation to resolve the IP address, since the MPRE is the selected designated instance but cannot resolve destination IP address from its existing routing table entries. After making the ARP request and receiving the reply for the ARP, the process 2100 proceeds to 2170 to update its routing table, route (at 2145) the data packet, forwards (at 2148) the data packet, and ends.

Figures 22, 23:
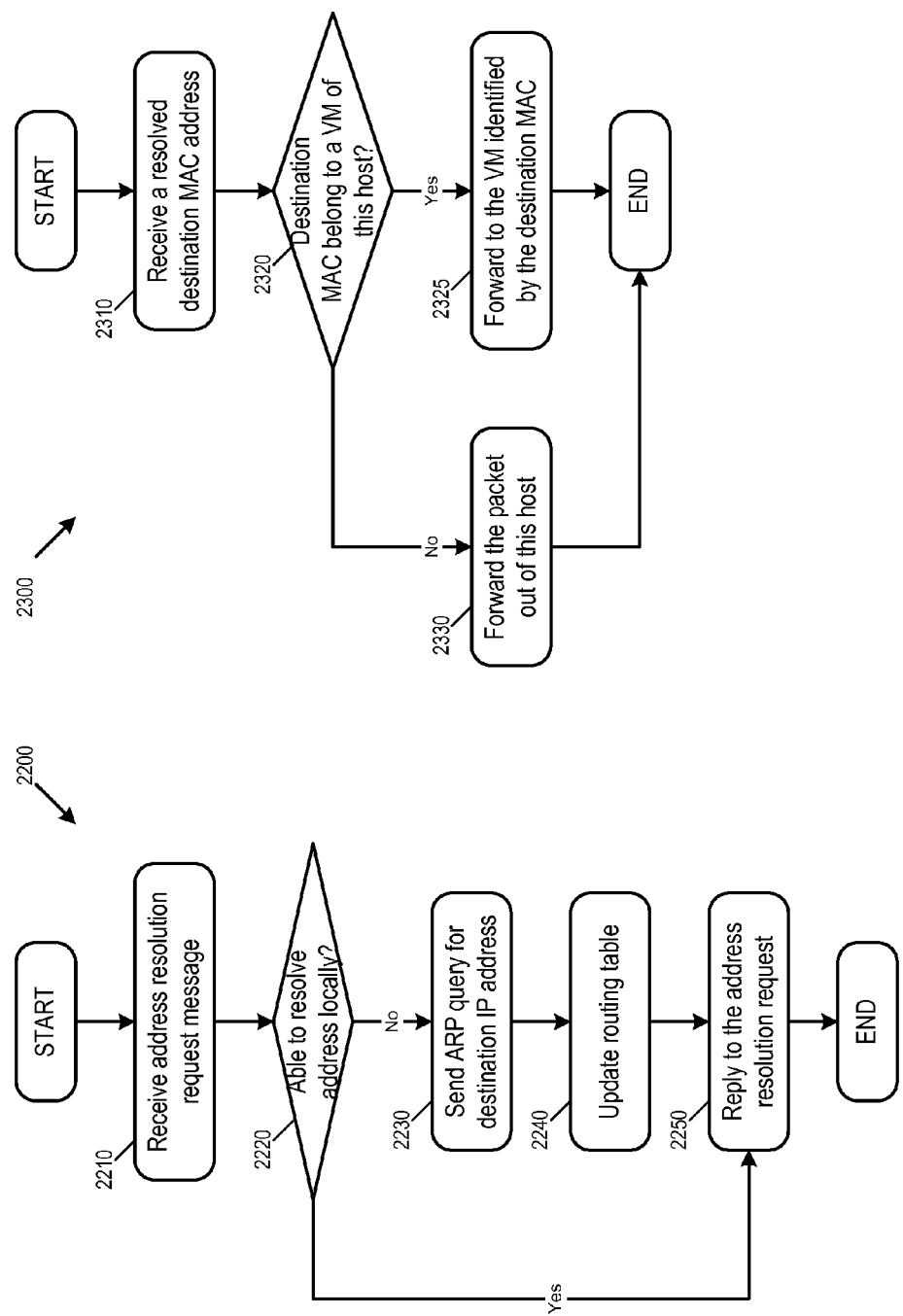
FIG. 22 conceptually illustrates a process for performing address resolution at a designated instance MPRE.
FIG. 23 conceptually illustrates a process for performing packet routing and forwarding at an MPRE in some embodiments.

For some embodiments, FIG. 22 conceptually illustrates a process 2200 for performing address resolution at a designated instance MPRE. The process starts when it receives (at 2210) an address resolution request message from a host machine (e.g., from an MPRE performing the process 2100) for a destination IP address with unknown MAC address. The process then determines (at 2220) if it is able to resolve the requested destination IP address locally, i.e., if the requested address is in the MPRE's own routing table. If so, the process proceeds to 2250. If the process cannot resolve the requested address, it proceeds to 2230 to broadcast an ARP request for the requested destination IP address. The process then updates (at 2240) its routing table after it receives the corresponding ARP reply bearing the resolved MAC address. The process then replies (at 2250) to the address resolution request by informing the requester of the resolved MAC address. The process 2200 then ends. In some embodiments, the address resolution request message and the address resolution reply messages are UDP messages.

FIG. 23 conceptually illustrates a process 2300 for performing packet routing and forwarding at an MPRE in some embodiments. In some embodiments, the process 2300 is performed as part of the operations 2145 and 2148 in the process 2100. The process 2300 starts when it receives a data packet with a resolved destination MAC address. The MAC address can come as a part of the data packet being already resolved at the sender. This MPRE may also resolve the MAC address locally by using its own routing table, requesting address resolution from a designated instance, or by performing an ARP operation. The resolved MAC address informs the process what is the next hop for the message. The process then determines (at 2320) whether the destination MAC address belongs to a VM running on this host machine. If so, the process forwards (at 2325) the packet to the VM identified by the MAC address. Otherwise the process forwards (at 2330) the packet out of this host machine. The process 2300 then ends.

III. Configuration of Logical Routing Element

In some embodiments, the LRE instantiations operating locally in host machines as MPREs (either for routing and/or bridging) as described above are configured by configuration data sets that are generated by a cluster of controllers. The controllers in some embodiments in turn generate these configuration data sets based on logical networks that are created and specified by different tenants or users. In some embodiments, a network manager for a network virtualization infrastructure allows users to generate different logical networks that can be implemented over the network virtualization infrastructure, and then pushes the parameters of these logical networks to the controllers so the controllers can generate host machine specific configuration data sets, including configuration data for LREs. In some embodiments, the network manager provides instructions to the host machines for fetching configuration data for LREs from the controllers.

Figure 24:
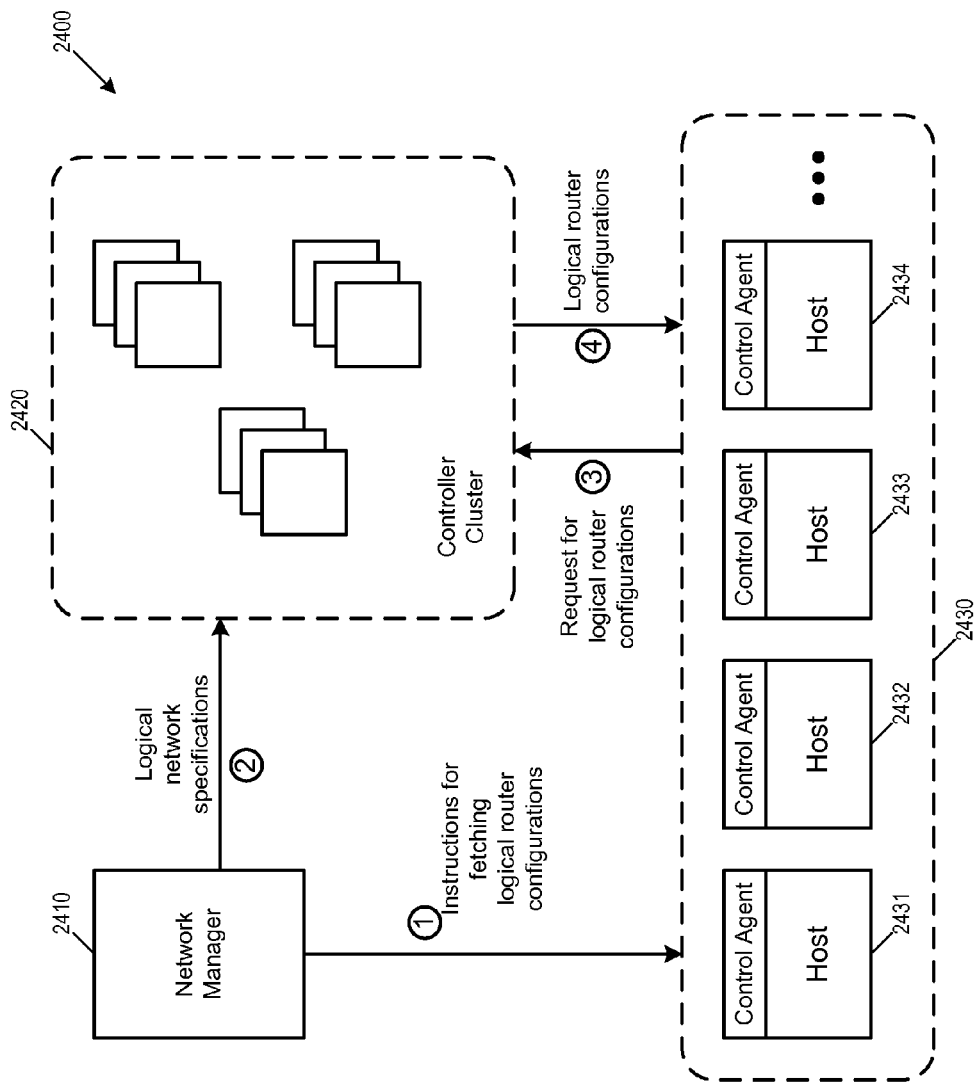
FIG. 24 illustrates a network virtualization infrastructure, in which logical network specifications are converted into configurations for LREs in host machines.

For some embodiments, FIG. 24 illustrates a network virtualization infrastructure 2400, in which logical network specifications are converted into configurations for LREs in host machines (to be MPREs/bridges). As illustrated, the network virtualization infrastructure 2400 includes a network manager 2410, one or more clusters of controllers 2420, and host machines 2430 that are interconnected by a physical network. The host machines 2430 includes host machines 2431-2439, though host machines 2435-2439 are not illustrated in this figure.

The network manager 2410 provides specifications for one or more user created logical networks. In some embodiments, the network manager includes a suite of applications that let users specify their own logical networks that can be virtualized over the network virtualization infrastructure 2400. In some embodiments the network manager provides an application programing interface (API) for users to specify logical networks in a programing environment. The network manager in turn pushes these created logical networks to the clusters of controllers 2420 for implementation at the host machines.

The controller cluster 2420 includes multiple controllers for controlling the operations of the host machines 2430 in the network virtualization infrastructure 2400. The controller creates configuration data sets for the host machines based on the logical networks that are created by the network managers. The controllers also dynamically provide configuration update and routing information to the host machines 2431-2434. In some embodiments, the controllers are organized in order to provide distributed or resilient control plane architecture in order to ensure that each host machines can still receive updates and routes even if a certain control plane node fails. In some embodiments, at least some of the controllers are virtual machines operating in host machines.

The host machines 2430 operate LREs and receive configuration data from the controller cluster 2420 for configuring the LREs as MPREs/bridges. Each of the host machines includes a controller agent for retrieving configuration data from the cluster of controllers 2420. In some embodiments, each host machine updates its MPRE forwarding table according to a VDR control plane. In some embodiments, the VDR control plane communicates by using standard route-exchange protocols such as OSPF (open shortest path first) or BGP (border gateway protocol) to routing peers to advertise/determine the best routes.

FIG. 24 also illustrates operations that take place in the network virtualization infrastructure 2400 in order to configure the LREs in the host machines 2430. In operation '1', the network manager 2410 communicates instructions to the host machines for fetching configuration for the LREs. In some embodiments, this instruction includes the address that points to specific locations in the clusters of controllers 2420. In operation '2', the network manager 2410 sends the logical network specifications to the controllers in the clusters 2420, and the controllers generate configuration data for individual host machines and LREs.

In operation '3', the controller agents operating in the host machines 2430 send requests for LRE configurations from the cluster of controllers 2420, based on the instructions received at operation '2'. That is, the controller agents contact the controllers to which they are pointed by the network manager 2410. In operation '4', the clusters of controllers 2420 provide LRE configurations to the host machines in response to the requests.

Figure 25:
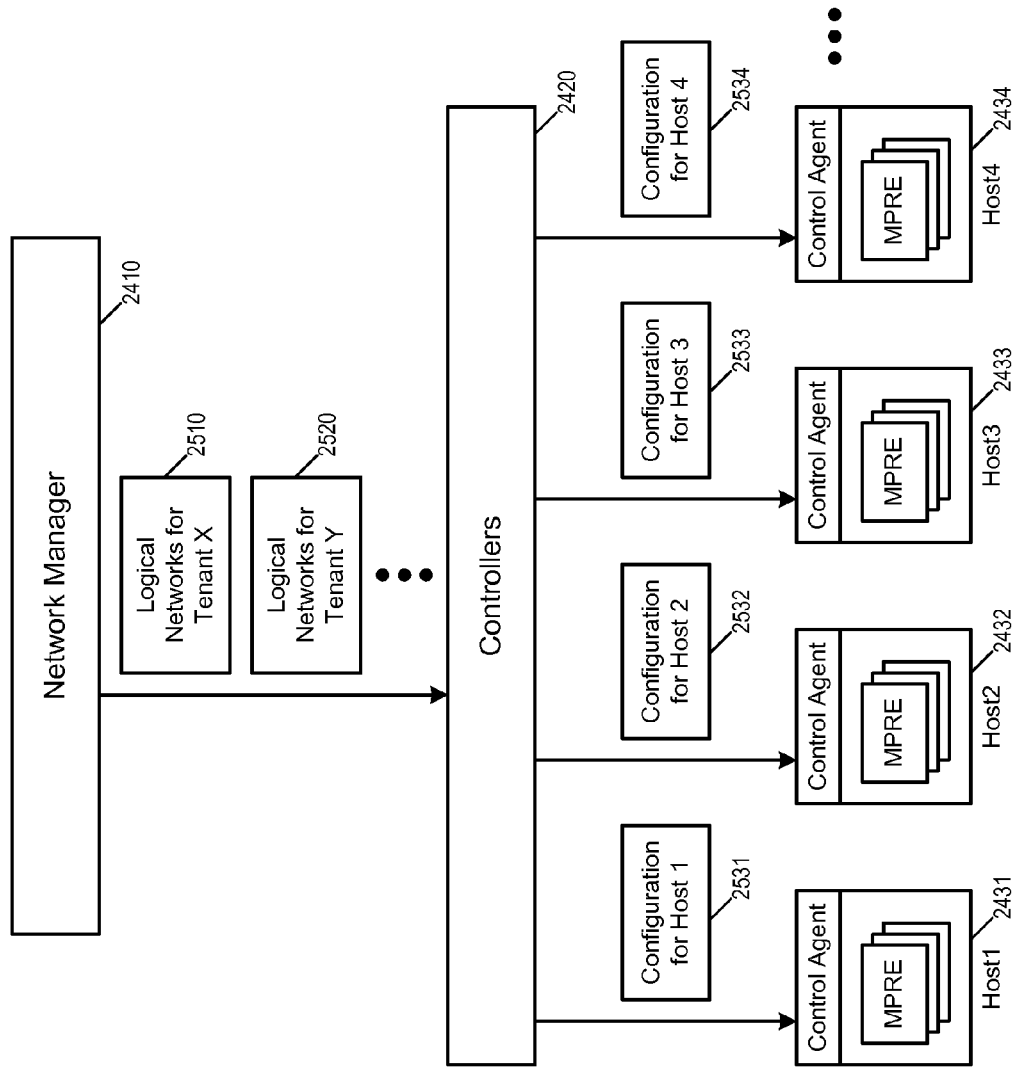
FIG. 25 conceptually illustrates the delivery of configuration data from a network manager to LREs operating in individual host machines.

FIG. 25 conceptually illustrates the delivery of configuration data from the network manager 2410 to LREs operating in individual host machines 2431-2434. As illustrated, the network manager 2410 creates logical networks for different tenants according to user specification. The network manager delivers the descriptions of the created logical networks 2510 and 2520 to the controllers 2420. The controller 2420 in turn processes the logical network descriptions 2510 and 2520 into configuration data sets 2531-2534 for delivery to individual host machines 2431-2434, respectively. In other embodiments, however, the network manager generates these configuration data sets, and the controllers are only responsible for the delivery to the host machines. These configuration data sets are in turn used to configure the LREs of the different logical networks to operate as MPREs in individual host machines.

Figure 26:
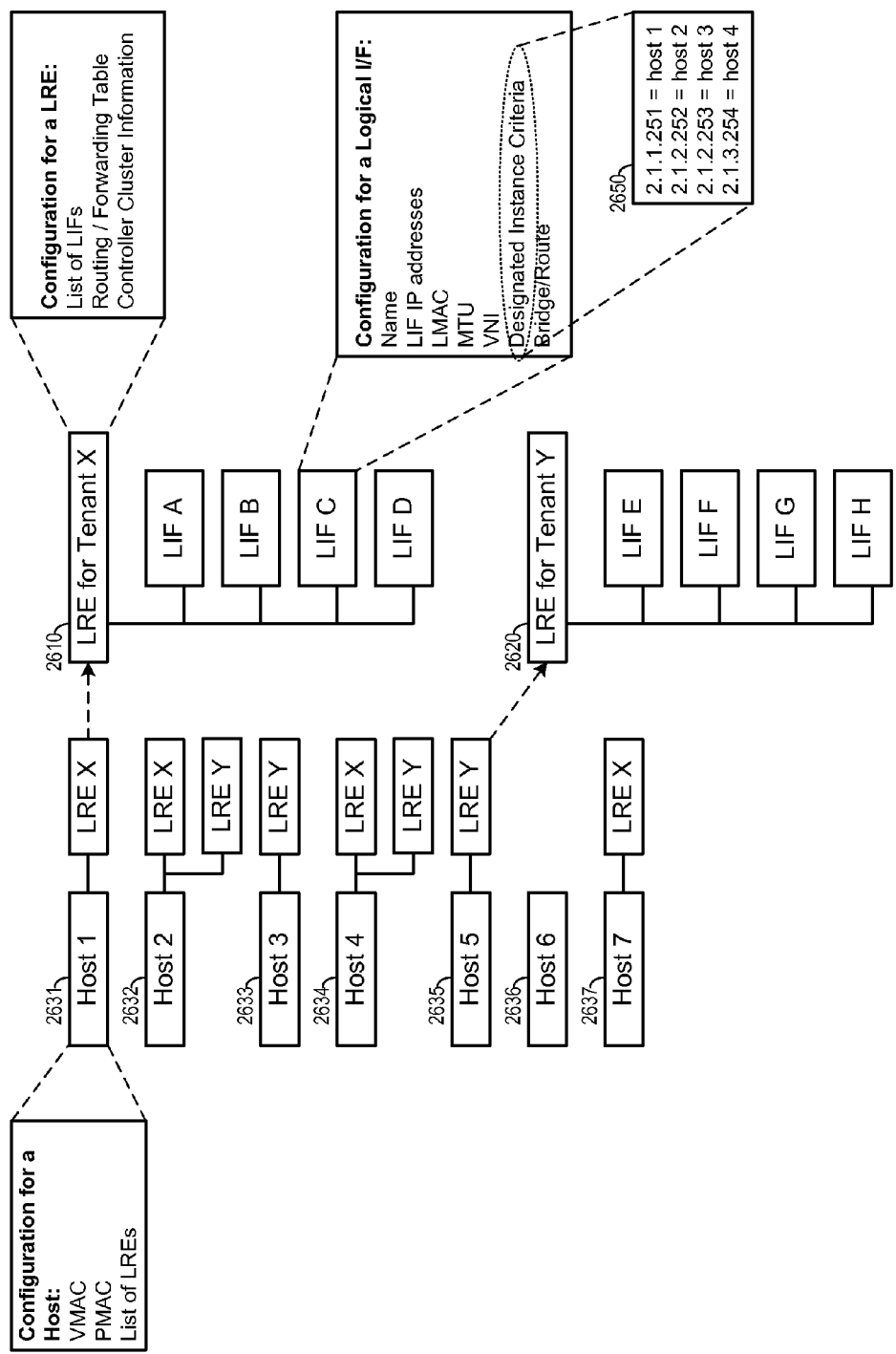
FIG. 26 illustrates a structure of the configuration data sets that are delivered to individual host machines.

FIG. 26 illustrates the structure of the configuration data sets that are delivered to individual host machines. The figure illustrates the configuration data sets 2531-2537 for host machines 2431-2439. The host machines are operating two LREs 2610 and 2620 for two different tenants X and Y. The host machines 2431, 2432, 2434, and 2437 are each configured to operate a MPRE of the LRE 2610 (of tenant X), while the host machines 2432, 2433, 2434, and 2435 are each configured to operate a MPRE of the LRE 2620 (for tenant Y). It is worth noting that different LREs for different logical networks of different tenants can reside in a same host machine, as discussed above by reference to FIG. 4. In the example of FIG. 26, the host machine 2432 is operating MPREs for both the LRE 2610 for tenant X and the LRE 2620 for tenant Y.

The LRE 2610 for tenant X includes LIFs for network segments A, B, and C. The LRE 2620 for tenant Y includes LIFs for network segments D, E, and F. In some embodiments, each logical interface is specific to a logical network, and no logical interface can appear in different LREs for different tenants.

The configuration data for a host in some embodiments includes its VMAC (which is generic for all hosts), its unique PMAC, and a list of LREs running on that host. For example, the configuration data for the host 2433 would show that the host 2433 is operating a MPRE for the LRE 2620, while the configuration data for the host 2434 would show that the host 2434 is operating MPREs for the LRE 2610 and the LRE 2620. In some embodiments, the MPRE for tenant X and the MPRE for tenant Y of a given host machine are both addressable by the same unique PMAC assigned to the host machine.

The configuration data for an LRE in some embodiments includes a list of LIFs, a routing/forwarding table, and controller cluster information. The controller cluster information, in some embodiments, informs the host where to obtain updated control and configuration information. In some embodiments, the configuration data for an LRE is replicated for all of the LRE's instantiations (i.e., MPREs) across the different host machines.

The configuration data for a LIF in some embodiments includes the name of the logical interface (e.g., a UUID), its set of IP addresses, its MAC address (i.e., LMAC or VMAC), its MTU (maximum transmission unit), its destination info (e.g., the VNI of the network segment with which it interfaces), whether it is active or inactive on the particular host, and whether it is a bridge LIF or a routing LIF. The configuration data for LIF also includes a designated instance criteria field 2650.

In some embodiments, the designated instance criteria is an external facing parameters that indicate whether a LRE running on a host as its MPRE is a designated instance and needs to perform address resolution for physical hosts. In some embodiments, such criteria for designated instances is a list (e.g., 2650) of the IP address for the LIF and the corresponding identifiers for the host machines selected to serve as the designated instance/designated host machine for those IP addresses. In some embodiments, a host machine that receives the configuration data determines whether it is a designated host machine (i.e., operating a MPRE that is the designated instance) for one of the LIF IP addresses by examining the list 2650. A host machine (e.g., host 2) knows to operate its MPRE as a designated instance for a particular LIF IP address (e.g., 2.1.2.252) when it sees its own identifier associated with that particular LIF IP addresses in the designated instance criteria 2650.

In some embodiments, the LREs are configured or controlled by APIs operating in the network manager. For example, some embodiments provide APIs for creating a LRE, deleting an LRE, adding a LIF, and deleting a LIF. In some embodiments, the controllers not only provide static configuration data for configuring the LREs operating in the host machines (as MPRE/bridges), but also provide static and/or dynamic routing information to the local LRE instantiations running as MPREs. Some embodiments provide APIs for updating LIFs (e.g., to update the MTU/MAC/IP information of a LIF), and add or modify route entry for a given LRE. A routing entry in some embodiments includes information such as destination IP or subnet mask, next hop information, logical interface, metric, route type (neighbor entry or next hop or interface, etc.), route control flags, and actions (such as forward, blackhole, etc.).

Figure 27:
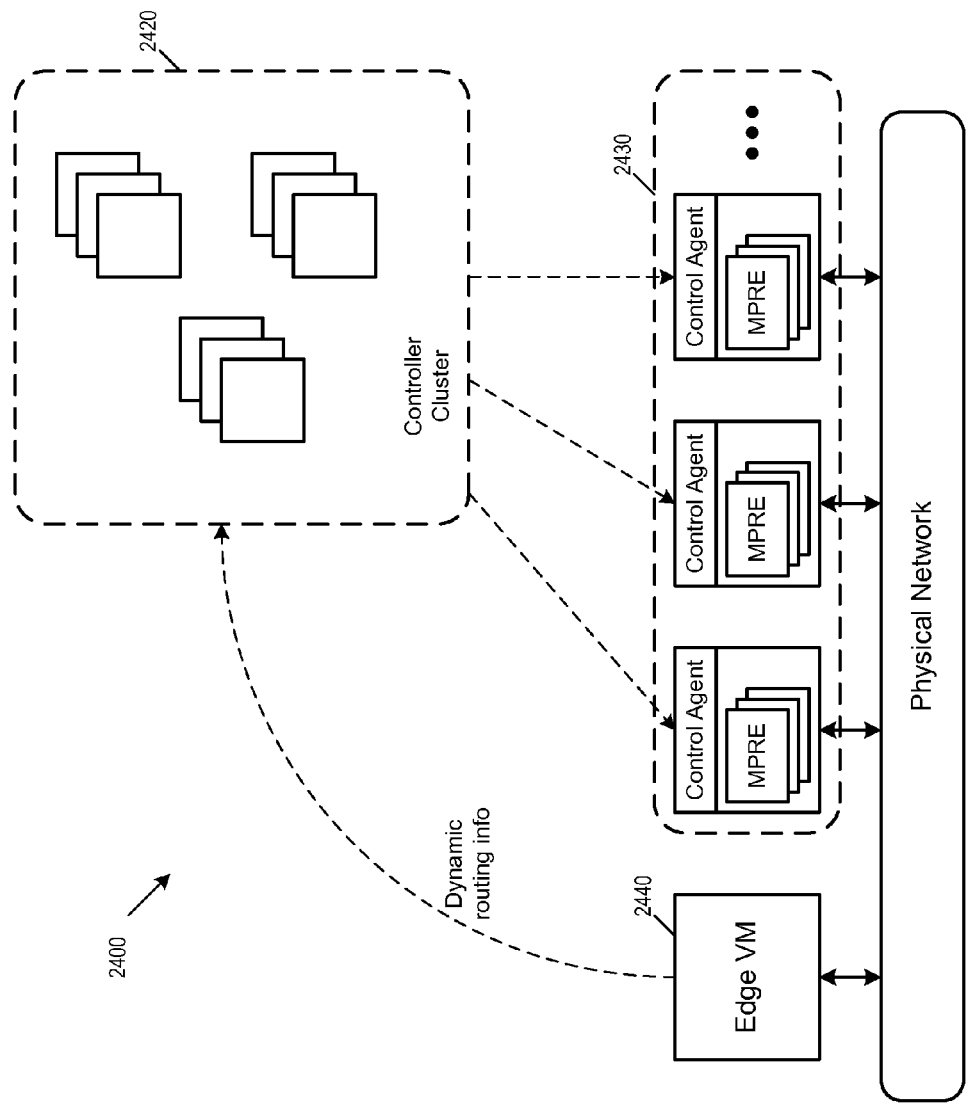
FIG. 27 illustrates the gathering and the delivery of dynamic routing information for LREs.

Some embodiments dynamically gather and deliver routing information for the LREs operating as MPREs. FIG. 27 illustrates the gathering and the delivery of dynamic routing information for LREs. As illustrated, the network virtualization infrastructure 2400 not only includes the cluster of controllers 2420 and host machines 2430, it also includes a host machine 2440 that operates a virtual machine ("edge VM") for gathering and distributing dynamic routing information. In some embodiments, the edge VM 2440 executes OSPF or BGP protocols and appears as an external router for another LAN or other network. In some embodiments, the edge VM 2440 learns the network routes from other routers. After validating the learned route in its own network segment, the edge VM 2440 sends the learned routes to the controller clusters 2420. The controller cluster 2420 in turn propagates the learned routes to the MPREs in the host machines 2430.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 28:
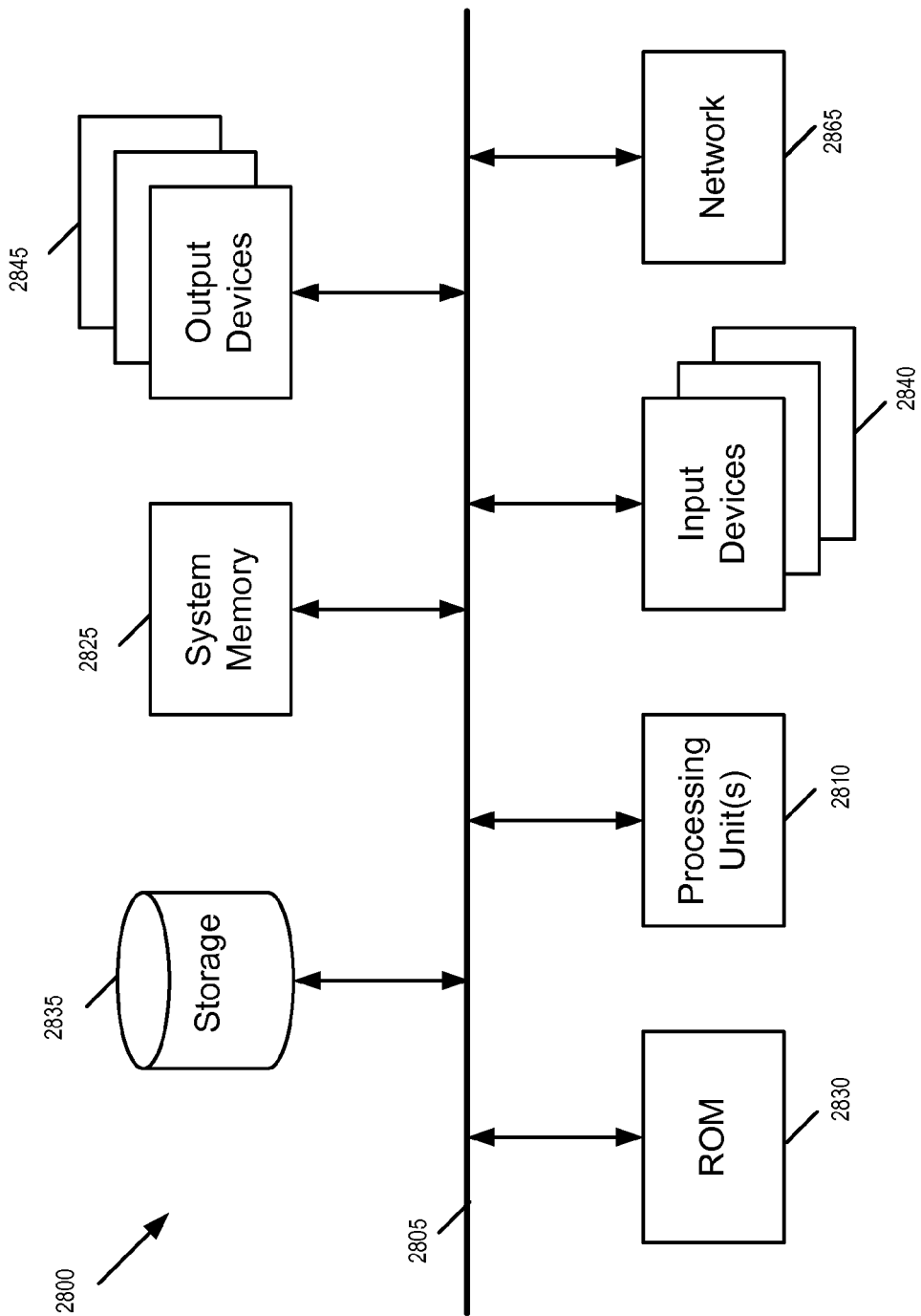
FIG. 28 conceptually illustrates an electronic system with which some embodiments of the invention are implemented.

FIG. 28 conceptually illustrates an electronic system 2800 with which some embodiments of the invention are implemented. The electronic system 2800 can be used to execute any of the control, virtualization, or operating system applications described above. The electronic system 2800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2800 includes a bus 2805, processing unit(s) 2810, a system memory 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the system memory 2825, and the permanent storage device 2835.

From these various memory units, the processing unit(s) 2810 retrieves instructions to execute and data to process in order to execute the processes of the invention. The processing unit(s) may be a single processor or a multi-core processor in different embodiments.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, etc.) as the permanent storage device. Like the permanent storage device 2835, the system memory 2825 is a read-and-write memory device. However, unlike storage device 2835, the system memory is a volatile read-and-write memory, such a random access memory. The system memory stores some of the instructions and data that the processor needs at runtime. In some embodiments, the invention's processes are stored in the system memory 2825, the permanent storage device 2835, and/or the read-only memory 2830. From these various memory units, the processing unit(s) 2810 retrieves instructions to execute and data to process in order to execute the processes of some embodiments.

The bus 2805 also connects to the input and output devices 2840 and 2845. The input devices enable the user to communicate information and select commands to the electronic system. The input devices 2840 include alphanumeric keyboards and pointing devices (also called "cursor control devices"). The output devices 2845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 28, bus 2805 also couples electronic system 2800 to a network 2865 through a network adapter (not shown). In this manner, the computer can be a part of a network of computers (such as a local area network ("LAN"), a wide area network ("WAN"), or an Intranet, or a network of networks, such as the Internet. Any or all components of electronic system 2800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 14, 15a-b, 18, 21, 22, and 23) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A logical network comprising:
a plurality of host machines implementing a logical routing element (LRE), each host machine operating a set of virtual machines (VMs) and a managed physical routing element (MPRE) for routing data packets from the VMs operating on the host machine to network nodes in the logical network in order to implement the LRE; and
a plurality of physical machines that are external to the host machines, the plurality of physical machines not implementing the LRE,
wherein multiple MPREs in a subset of the plurality of host machines are selected for (i) responding to address resolution protocol (ARP) messages sent by the physical machines and (ii) performing L3 routing on data packets from the plurality of physical machines to the VMs operating on the host machines.

2. The logical network of claim 1, wherein each MPRE of the multiple MPREs in the subset is assigned a different IP address for responding to the ARP messages querying for its assigned IP address.

3. The logical network of claim 2, wherein each of the multiple MPREs responds to an ARP message by resolving its assigned IP address to its own MAC address.

4. The logical network of claim 2, wherein the different IP addresses assigned to the MPREs in the subset belong to a same network segment.

5. The logical network of claim 4, wherein the network segment corresponds to an overlay encapsulation network.

6. The logical network of claim 4, wherein the network segment comprises a plurality of IP subnets.

7. The logical network of claim 4, wherein the different IP addresses belong to at least two different IP subnets.

8. The logical network of claim 1, wherein the MPRE of each host machine performs L3 routing on data packets from the VMs of the host machine to the plurality of physical machines.

9. A method comprising:
provisioning a logical routing element (LRE) of a logical network in a plurality of host machines, each host machine executing a set of virtual machines (VMs) and operating a managed physical routing element (MPRE) for routing data packets from one of the VMs executing at the host machine to network nodes in the logical network in order to implement the LRE;
providing a plurality of address resolution protocol (ARP) gateway addresses to a set of physical machines that do not implement the LRE; and
assigning different subsets of the plurality of ARP gateway addresses to different host machines operating the LRE, wherein each host machine assigned a subset of the ARP gateway addresses responds to ARP requests for addresses in its assigned subset of ARP gateway addresses.

10. The method of claim 9, wherein each host machine assigned a subset of the ARP gateway addresses responds to ARP requests for addresses in its assigned subset of ARP gateway addresses from the set of physical machines.

11. The method of claim 10, wherein each host machine assigned a subset of the ARP gateway addresses ignores ARP requests from physical machines for addresses not in its assigned subset of ARP gateway addresses.

12. The computing device of claim 9, wherein the logical network comprises a plurality of network segments, wherein each ARP gateway address is associated with a network segment.

13. The computing device of claim 12, wherein at least one of the plurality of network segments is associated with a plurality of ARP gateway addresses.

14. A system comprising:
a plurality of host machines implementing a logical network and a logical routing element (LRE) for routing packets of the logical network, each host machine operating a set of virtual machines (VMs) and a managed physical routing element (MPRE) for routing data packets from the VMs operating on the host machine to network nodes in the logical network in order to implement the LRE; and
a physical machine that does not implement the LRE, wherein multiple MPREs operating on a subset of the plurality of host machines are selected as designated instances for routing data packets from the physical machine to network nodes in the logical network, wherein each MPRE of the multiple MPREs in the subset is assigned a different IP address for responding to address resolution protocol (ARP) queries from the physical machine.

15. The system of claim 14, wherein each of the multiple MPREs responds to an ARP query by resolving its assigned IP address to its own MAC address.

16. The system of claim 14, wherein the different IP addresses assigned to the MPREs in the subset belong to a same network segment.

17. The system of claim 16, wherein the network segment corresponds to an overlay encapsulation network.

18. The system of claim 16, wherein the network segment comprises a plurality of IP subnets.

19. The system of claim 16, wherein the different IP addresses belong to at least two different IP subnets.

20. The system of claim 14, wherein the MPRE of each host machine performs L3 routing on data packets from the VMs of the host machine to the plurality of physical machine.

* * * * *